United States Patent
Toya et al.

(10) Patent No.: US 7,999,875 B2
(45) Date of Patent: Aug. 16, 2011

(54) SOLID-STATE IMAGING DEVICE

(75) Inventors: Hiroshi Toya, Osaka (JP); Hiroshi Kubo, Osaka (JP)

(73) Assignee: PANASONIC Corporation, Osaka (JP)

( * ) Notice: Subject to any disclaimer, the term of this patent is extended or adjusted under 35 U.S.C. 154(b) by 609 days.

(21) Appl. No.: 12/102,474

(22) Filed: Apr. 14, 2008

(65) Prior Publication Data

US 2008/0259193 A1    Oct. 23, 2008

(30) Foreign Application Priority Data

Apr. 19, 2007  (JP) ................................ 2007-111073

(51) Int. Cl.
H04N 5/235    (2006.01)
H01L 31/062   (2006.01)

(52) U.S. Cl. ..................................... 348/360; 257/290
(58) Field of Classification Search .................. 348/300, 348/308, 301, 362, 294; 257/290–292; 250/208.1
See application file for complete search history.

(56) References Cited

U.S. PATENT DOCUMENTS

| | | | |
|---|---|---|---|
| 6,300,632 B1 * | 10/2001 | Liu et al. .................... | 250/338.4 |
| 6,642,500 B2 * | 11/2003 | Takahashi ................ | 250/214 L |
| 7,141,775 B2 | 11/2006 | Koseki | |
| 7,375,672 B2 * | 5/2008 | Muramatsu et al. .......... | 341/164 |
| 7,652,702 B2 * | 1/2010 | Murakami et al. ........... | 348/294 |
| 2005/0029454 A1 * | 2/2005 | Iida et al. ..................... | 250/332 |
| 2005/0194520 A1 | 9/2005 | Koseki | |
| 2006/0202926 A1 * | 9/2006 | Kobashi et al. ................ | 345/87 |
| 2007/0091191 A1 * | 4/2007 | Oike ............................. | 348/294 |
| 2007/0200238 A1 * | 8/2007 | Ikegami et al. ............... | 257/734 |
| 2008/0018770 A1 | 1/2008 | Kato | |
| 2008/0024638 A1 | 1/2008 | Murakami | |
| 2008/0061216 A1 | 3/2008 | Kasuga et al. | |
| 2008/0074527 A1 | 3/2008 | Kato | |
| 2008/0079106 A1 | 4/2008 | Miyagawa et al. | |

FOREIGN PATENT DOCUMENTS

JP    2005-252529    9/2005

OTHER PUBLICATIONS

English language Abstract of JP 2005-252529.
Kenji Taniguchi, "LSI sekkei notameno CMOS analog kairo nyumon (CMOS circuits Manual for Designing LSI)", CQ Publishing Co., Ltd., p. 101, Line 3-p. 102, Line 15 (Jan. 2005).
China Office action, mail date is Jan. 26, 2011.

* cited by examiner

Primary Examiner — Lin Ye
Assistant Examiner — Trung Diep
(74) Attorney, Agent, or Firm — Greenblum & Bernstein, P.L.C.

(57) ABSTRACT

A solid-state imaging device includes column amplifiers that are each provided for a different one of column signal lines. Each column amplifier includes: a constant current circuit that supplies a constant current; an amplifier circuit that is connected in series with the constant current circuit, and amplifies a pixel signal from a corresponding column signal line and outputs the amplified signal from a point of connection with the constant current circuit; and a resistor circuit that is connected in parallel with the amplifier circuit and has a constant resistance.

24 Claims, 30 Drawing Sheets

SOLID-STATE IMAGING DEVICE

BACKGROUND OF THE INVENTION (1) Field of the Invention

The present invention relates to a solid-state imaging device including column amplifier units that are each provided for a different one of column signal lines which carry pixel signals from a plurality of pixel units arranged in a matrix.

(2) Description of the Related Art

Imaging equipment that uses a solid-state imaging device, such as a home video camera and a digital still camera, has become widely used in recent years. Such imaging equipment may include an amplifier-type image sensor as a solid-state imaging device.

FIG. 1 is a block diagram showing a structure of a solid-state imaging device according to a conventional technique. This solid-state imaging device is a MOS image sensor, and includes an imaging area 510 made up of a plurality of pixel units 501 arranged in a matrix, a load circuit 502, a row selection decoder 503, a column selection decoder 504, a column amplifier unit 505 made up of a plurality of column amplifiers 506, and an output amplifier 507. Each column signal line carries a pixel signal of a pixel unit in a row selected by the row selection decoder 503, from among pixel signals of pixel units connected to a corresponding column. Each column amplifier 506 amplifies a pixel signal from a corresponding column signal line. A horizontal common signal line carries an amplified signal selected by the column selection decoder 504, from among amplified signals of the plurality of column amplifiers 506.

FIG. 2 is a block diagram showing one column amplifier 506. In FIG. 2, the column amplifier 506 includes a load circuit 511 and an amplifier circuit 512 that are connected in series with each other. The load circuit 511 and the amplifier circuit 512 are each formed by one MOS transistor. The amplifier circuit 512 inverse-amplifies a pixel signal from a column signal line, and outputs the inverse-amplified signal.

Such an amplifier-type solid-state imaging device exhibits excellent characteristics such as low noise. However, the amplifier-type solid-state imaging device also has the following problem. When strong light enters, noise called horizontal streaking or horizontal banding appears in a horizontal direction of an image. This phenomenon occurs because a large change of an amplified signal outputted from a column amplifier 506 corresponding to strong light affects adjacent column amplifiers 506. The noise is called horizontal streaking in the case where it is narrow in a vertical direction, and horizontal banding in the case where it is wide in the vertical direction.

FIGS. 3A and 3B show an example image where horizontal streaking appears. The image shown in FIG. 3A is obtained, for instance, when a wall having a small, very bright window is photographed from inside a dark room. The white rectangular area in the middle of the image corresponds to the bright window. Strong light enters a rectangular area in the imaging area 510 corresponding to this white rectangular area, whilst weak light enters a surrounding area of the rectangular area. As shown in FIG. 3A, dark horizontal streaking appears on both sides of the rectangular area.

FIG. 3B shows pixel brightness in A-A' and B-B' shown in FIG. 3A. In FIG. 3B, the vertical axis represents pixel brightness, and the horizontal axis represents a pixel position in the horizontal direction. As can be seen from FIG. 3B, horizontal streaking or horizontal banding contains two types of noise, namely, highlight horizontal streak noise and highlight horizontal streak shading. The difference between A-A' and B-B' in FIG. 3B is the highlight horizontal streak noise. When the wall has a uniform color, the image other than the highlight rectangular area should have the same brightness. Despite this, B-B' is darker than A-A'. The difference in brightness in the part of B-B' corresponding to the wall in FIG. 3B is the highlight horizontal streak shading. Although the part of B-B' corresponding to the wall should have the same brightness, the brightness differs between a vicinity of the highlight rectangular area and edges of the image.

Such horizontal streaking can occur due to the following reason. Since an extremely large number of column amplifiers 506 exist in the column amplifier unit 505, parasitic resistances of a power line and a ground line which connect these numerous column amplifiers 506 are not negligible. This being so, a current flowing in each column amplifier 506 causes a difference in potential between middle and edge portions of the column amplifier unit 505. Moreover, when a current flowing in a column amplifier 506 fluctuates due to strong light, fluctuations in the power line and the ground line affect other column amplifiers 506, as a result of which horizontal streaking emerges.

Various techniques have been proposed to prevent such horizontal streaking or horizontal banding (for example, see Patent Reference 1).

FIG. 4 is a block diagram showing a structure of a column amplifier included in a solid-state imaging device disclosed in Patent Reference 1. A rough structure of this solid-state imaging device is the same as the one shown in FIG. 1, where the column amplifier shown in FIG. 4 corresponds to one of the column amplifiers provided on a column basis in the column amplifier unit 505 in FIG. 1. The column amplifier shown in FIG. 4 includes a constant current source 512, an amplifier circuit 522, a limiter circuit 523, and a load circuit 524.

The limiter circuit 523 is connected to an output signal line of the amplifier circuit 522, and performs a switching operation of turning ON when an output voltage of the amplifier circuit 522 exceeds a threshold value. By limiting the output voltage of the amplifier circuit 522 in this way, current consumption of the amplifier circuit 522 is held constant to thereby prevent fluctuations in the power line and the ground line to which the plurality of column amplifiers are connected.

[Patent Reference 1] Japanese Patent Application No. 2004-058621, FIGS. 3 and 6

[Non-patent Reference 1] Kenji Taniguchi *LSI sekkeishano tameno CMOS analog kairo nyumon* (Introduction to CMOS analog circuits for LSI designers), CQ Publishing, January 2005

However, the circuit disclosed in Patent Reference 1 has the following problem.

The limiter circuit 523 performs the switching operation of turning ON when the amplified signal exceeds the threshold value. This switching operation induces a current fluctuation. Patent Reference 1 discloses the addition of a regulated cascode circuit to solve this problem. This, however, requires an increase in the number of circuit elements. Accordingly, the circuit disclosed in Patent Reference 1 is not suitable for pixel miniaturization and high-densification.

SUMMARY OF THE INVENTION

In view of the above problems, an object of the present invention is to provide a solid-state imaging device and a driving method for the solid-state imaging device that can reliably prevent horizontal streaking and horizontal banding with a smaller number of circuit elements.

The stated object can be achieved by a solid-state imaging device including: a plurality of pixel units that are arranged in a matrix; column signal lines that are each provided for a different one of columns of the matrix to carry a pixel signal from a pixel unit which belongs to a corresponding column; and column amplifier units that are each provided for a different one of the column signal lines, wherein each of the column amplifier units includes: a constant current circuit that supplies a constant current; an amplifier circuit that is connected in series with the constant current circuit, and amplifies a pixel signal from a corresponding column signal line and outputs the amplified signal from a point of connection with the constant current circuit; and a resistor circuit that is connected in parallel with the amplifier circuit and has a constant resistance.

According to this structure, the following two effects can be attained. First, a fluctuation in current which flows in each column amplifier unit can be reliably suppressed, with it being possible to prevent horizontal streaking. This is because the current supplied from the constant current circuit is divided into a first current flowing through the amplifier circuit and a second current flowing through the resistor circuit, and a sum of the first current and the second current is constant even when the amplified signal changes in voltage. Which is to say, since a change in voltage of the amplified signal is also a change in voltage applied to the resistor circuit, a current fluctuation of the resistor circuit and a current fluctuation of the amplifier circuit cancel each other out. In other words, the amplifier circuit and the resistor circuit have mutually folded currents in accordance with the voltage change of the amplified signal. Because of this folding, the sum of the first current and the second current remains unchanged, so that a current fluctuation of each column amplifier unit can be prevented.

Second, since the above folding is not a switching operation, the resistor circuit causes no current fluctuation associated with a switching operation. This makes it unnecessary to add a circuit for removing switching noise (such as a conventional regulated cascode) to each column amplifier unit. As a result, each column amplifier unit can be formed by a smaller number of circuit elements.

Here, the solid-state imaging device may further include: correlated double sampling circuits that each receive an amplified signal from a different one of the column amplifier units; and an output unit that receives a signal from any of the correlated double sampling circuits and outputs an analog signal.

Here, the solid-state imaging device may further include: correlated double sampling circuits that each receive an amplified signal from a different one of the column amplifier units; and AD converters that each receive a signal from a different one of the correlated double sampling circuits, and convert the received signal from analog to digital.

According to this structure, by digitizing, in a high resolution, a plurality of pixel signals in a horizontal period using a plurality of column ADCs, high-speed data output can be achieved with a high band.

Here, the AD converters may be ramp AD converters.

Here, the AD converters may be up/down AD converters.

According to this structure, the correlated double sampling circuits are not necessary. This contributes to a smaller circuit size.

Here, the solid-state imaging device may further include: power wiring that is connected to the constant current circuits in the column amplifier units; and ground wiring that is connected to the amplifier circuits and the resistor circuits in the column amplifier units, wherein a metal wiring layer including the power wiring and the ground wiring is located above a wiring layer including wiring that connects the amplifier circuit with the resistor circuit in each of the column amplifier units.

Here, the constant current circuit may include one or more transistors as a constant current supply, wherein the amplifier circuit includes an amplifier transistor having a gate to which the pixel signal is inputted, and a source and a drain from one of which the amplified signal is outputted, and the resistor circuit includes a resistor transistor having a gate to which a bias voltage corresponding to a linear region is applied.

According to this structure, each column amplifier unit can be realized by a simple structure that uses three transistors at the minimum.

Here, the one or more transistors in the constant current circuit may be two cascode-connected pMOS transistors.

According to this structure, the cascode connection of the two MOS transistors increases an output impedance. As a result, even when the amplified signal changes in amplitude, the constant current can be maintained more stably.

Here, the solid-state imaging device may further include a bias circuit that controls an amount of constant current flowing in each of the column amplifier units, wherein the bias circuit includes: a first load nMOS transistor having a drain connected to a constant current source, a gate short-circuited with the drain, and a source connected to a ground; a first circuit that forms a current mirror with the first load nMOS transistor; and a second circuit that forms a current mirror with the first load nMOS transistor, the first circuit supplies a first bias voltage to a gate of one of the two cascode-connected PMOS transistors, the second circuit supplies a second bias voltage to a gate of an other one of the two cascode-connected PMOS transistors, and a ratio between a length and a width of a region of the amplifier transistor which is a MOS transistor is equal to a ratio between a length and a width of a region of the first load nMOS transistor, on a semiconductor substrate on which the solid-state imaging device is formed.

According to this structure, even when characteristic variations exist between solid-state imaging devices due to manufacturing, in each individual solid-state imaging device the MOS transistor as the amplifier circuit shows a same characteristic as the first load nMOS transistor. Therefore, the amplifier circuit can ensure an operating point of favorable linearity. Hence a wider input/output dynamic range of the amplifier circuit can be achieved.

Here, the first circuit may include: a first pMOS transistor having a gate short-circuited with a drain, a source connected to power wiring, and the drain connected to the gate of the one of the two cascode-connected pMOS transistors; and a first nMOS transistor having a drain connected to the drain of the first pMOS transistor, a gate connected to the gate of the first load nMOS transistor, and a source connected to the ground, wherein the second circuit includes: a second pMOS transistor having a gate short-circuited with a drain, a source connected to the power wiring, and the drain connected to the gate of the other one of the two cascode-connected pMOS transistors; and a second nMOS transistor having a drain connected to the drain of the second pMOS transistor, a gate connected to the gate of the first load nMOS transistor, and a source connected to the ground, and the ratio between the length and the width of the region of the amplifier transistor is equal to a ratio between a length and a width of each of a region of the first nMOS transistor and a region of the second nMOS transistor, on the semiconductor substrate on which the solid-state imaging device is formed.

According to this structure, even when characteristic variations exist between solid-state imaging devices due to manufacturing, in each individual solid-state imaging device the MOS transistor as the amplifier circuit shows a same characteristic as the first nMOS transistor and the second nMOS transistor. Therefore, the amplifier circuit can ensure an operating point of favorable linearity. Hence a wider input/output dynamic range of the amplifier circuit can be achieved.

Here, the drain of the first load nMOS transistor may be connected to the constant current source via a pad that is provided on the semiconductor substrate.

According to this structure, the constant current is supplied from the current source outside a chip of the solid-state imaging device. This being so, by using a highly accurate (for example, equal to or smaller than 1% in error) external resistor, a necessary amount of constant current can be supplied stably. As a result, each column amplifier unit can obtain a stable constant current, irrespective of characteristic variations between solid-state imaging devices due to manufacturing. Moreover, the solid-state imaging device can be simplified in structure and reduced in size.

Here, an amount of constant current of the constant current source may be adjustable, wherein the solid-state imaging device further includes a variable voltage generation unit that applies a variable bias voltage to the gate of the resistor transistor which is a MOS transistor.

Here, the drain of the first load nMOS transistor may be connected to the constant current source that is included in the solid-state imaging device.

According to this structure, even when characteristic variations exist between solid-state imaging devices due to manufacturing, in each individual solid-state imaging device the transistor characteristics change in a same manner between the constant current source and the other circuits. As a result, the constant current can be more stabilized.

Here, the constant current circuit may include two cascode-connected PMOS transistors as a constant current supply, wherein the amplifier circuit includes: a first switch; a first amplifier transistor having a drain connected to the constant current circuit via the first switch, a gate to which the pixel signal is inputted, and a source connected to a ground, and outputting the amplified signal from the drain; a second switch; and a second amplifier transistor having a drain connected to the constant current circuit via the second switch, a gate to which the pixel signal is inputted, and a source connected to the ground, and outputting the amplified signal from the drain, the resistor circuit includes: a third switch; a first resistor transistor having a drain connected to the constant current circuit via the third switch, and a gate to which a bias voltage corresponding to a linear region is applied; a fourth switch; and a second resistor transistor having a drain connected to the constant current circuit via the fourth switch, and a gate to which a bias voltage corresponding to a linear region is applied, the first switch and the third switch turn ON or OFF in conjunction with each other, and the second switch and the fourth switch turn ON or OFF in conjunction with each other.

According to this structure, the first to fourth switches enable the gain of the amplifier circuit to be switched simultaneously with the switching of the resistance of the resistor circuit.

Here, the solid-state imaging device may further include a bias circuit that controls an amount of constant current flowing in each of the column amplifier units, wherein the bias circuit includes: a fifth switch; a first load nMOS transistor having a drain connected to a constant current source via the fifth switch, a gate connected with the drain, and a source connected to the ground; a sixth switch; a second load nMOS transistor having a drain connected to the constant current source via the sixth switch, a gate connected with the drain, and a source connected to the ground; a first circuit that forms a current mirror with the first load nMOS transistor or the second load nMOS transistor; and a second circuit that forms a current mirror with the first load nMOS transistor or the second load nMOS transistor, the first circuit supplies a first bias voltage to a gate of one of the two cascode-connected PMOS transistors, the second circuit supplies a second bias voltage to a gate of an other one of the two cascode-connected PMOS transistors, the fifth switch turns ON or OFF in conjunction with the first switch and the third switch, and the sixth switch turns ON or OFF in conjunction with the second switch and the fourth switch.

According to this structure, the first to sixth switches enable the first and second bias voltages to be switched simultaneously with the switching of the gain of the amplifier circuit. As a result, the amplifier circuit can ensure an operating point of favorable linearity.

Here, the drain and the gate of the first load nMOS transistor may be connected to each other via the fifth switch, wherein the drain and the gate of the second load nMOS transistor are connected to each other via the sixth switch.

Here, the solid-state imaging device may further include: power wiring that is connected to the constant current circuits in the column amplifier units; and ground wiring that is connected to the amplifier circuits and the resistor circuits in the column amplifier units, wherein the power wiring and the ground wiring are exclusively used for the column amplifier units.

According to this structure, the power wiring and the ground wiring are not connected to other circuits, so that the column amplifier units can be kept from being affected by current fluctuations of other circuits.

Here, a ratio between a wiring resistance of the power wiring and a wiring resistance of the ground wiring may be equal to a ratio between a conductance of the constant current circuit and a conductance of the amplifier circuit and the resistor circuit in each of the column amplifier units.

According to this structure, even when the amplified signal greatly changes in voltage, a current fluctuation (denoted by $\alpha$) entering into an adjacent column amplifier unit via the constant current circuit and the power wiring and a current fluctuation (denoted by $-\alpha$) entering into the adjacent column amplifier unit via the amplifier circuit and the ground wiring cancel each other out. Accordingly, horizontal streak noise and horizontal streak shading can be suppressed. In other words, when an amplified signal of the adjacent column amplifier unit increases in potential due to the current fluctuation ($\alpha$) entering into the adjacent column amplifier unit via the power wiring (where an amount of voltage increase is denoted by $\beta$), the amplified signal of the adjacent column amplifier unit also decreases in potential due to the current fluctuation ($-\alpha$) entering into the adjacent column amplifier unit via the ground wiring (where an amount of voltage decrease is $\beta$), so that the amplified signal of the adjacent column amplifier unit can be kept from being affected by the voltage change.

Here, the power wiring and the ground wiring may have different widths to satisfy the wiring resistance ratio.

According to this structure, horizontal streaking can be easily prevented just by setting the width of the power wiring and the width of the ground wiring in accordance with the conductance ratio.

Here, the power wiring and the ground wiring may have different lengths to satisfy the wiring resistance ratio.

Here, a semiconductor substrate on which the solid-state imaging device is formed may include a power pad and a ground pad, wherein the solid-state imaging device further includes: first connection wiring that connects the power wiring to the power pad; and second connection wiring that connects the ground wiring to the ground pad, and a ratio between a width of the first connection wiring and a width of the second connection wiring or a ratio between a length of the first connection wiring and a length of the second connection wiring corresponds to the wiring resistance ratio.

Here, the power wiring may be metal wiring that is formed so as to shield the constant current circuits from light, and the ground wiring may be metal wiring that is formed so as to shield the amplifier circuits and the resistor circuits from light.

Here, the solid-state imaging device may further include a control circuit that controls a dynamic range of the resistor circuit, by applying the bias voltage to the gate of the resistor transistor in the resistor circuit, wherein the control circuit includes: a constant current supply unit that includes two cascode-connected PMOS transistors to which the first bias voltage and the second bias voltage are applied from the first circuit and the second circuit, respectively; and a load circuit that includes an nMOS transistor having a drain connected to the constant current supply unit, a gate connected with the drain, and a source connected to the ground, and supplies a gate potential of the nMOS transistor to the resistor circuit as the bias voltage, and a length of a region of the nMOS transistor in the load circuit is greater, by a predetermined value, than a length of a region of the resistor transistor which is a MOS transistor, on the semiconductor substrate on which the solid-state imaging device is formed.

According to this structure, the constant current supply unit has the same structure as the constant current circuit in each column amplifier unit, and the voltage applied to the resistor circuit is set to be slightly smaller than an upper limit of a possible potential of the constant current circuit and close to the upper limit. How much the voltage of the resistor circuit is smaller than the upper limit is determined in accordance with the predetermined value. The bias voltage supplied to the gate of the MOS transistor in the resistor circuit is set so that the voltage applied to the resistor circuit is close to the upper limit. This enables a linear region of the resistor circuit to be maximized. As a result, the output amplitude of the amplifier circuit can be used as efficiently as possible. Moreover, even when characteristic variations exist between solid-state imaging devices, in each individual solid-state imaging device the correlation in characteristics between transistors is unaffected. Accordingly, the linear region of the resistor circuit can be maximized without being affected by the characteristic variations.

Here, the bias circuit may further include a third circuit and a further circuit that are inserted in wiring for connecting the gate of the first load nMOS transistor and the first circuit, wherein the third circuit includes: a third PMOS transistor having a source connected to the power wiring, and a gate and a drain connected to each other; and a third nMOS transistor having a drain connected to the drain of the third PMOS transistor, a gate connected to the gate of the first load nMOS transistor, and a source connected to the ground, the fourth circuit includes: a fourth PMOS transistor having a source connected to the power wiring, and a gate connected to the gate of the third PMOS transistor; and a second load nMOS transistor having a drain connected to the drain of the fourth PMOS transistor, a gate connected with the drain, and a source connected to the ground, the gate of the first nMOS transistor in the first circuit is connected to the gate of the second load nMOS transistor instead of the gate of the first load nMOS transistor, and a length of a region of the second load nMOS transistor is smaller than a length of the region of the first nMOS transistor by a predetermined value, on the semiconductor substrate on which the solid-state imaging device is formed.

According to this structure, the amount of constant current of the constant current circuit can be maximized. As a result, the output amplitude of the amplifier circuit can be used as efficiently as possible. Moreover, even when characteristic variations exist between solid-state imaging devices, in each individual solid-state imaging device the correlation in characteristics between transistors is unaffected. Accordingly, the output amplitude of the amplifier circuit can be used as efficiently as possible, without being affected by the characteristic variations.

The stated object can also be achieved by a solid-state imaging device including: a plurality of pixel units that are arranged in a matrix; column signal lines that are each provided for a different one of columns of the matrix to carry a pixel signal from a pixel unit which belongs to a corresponding column; column amplifier units that are each provided for a different one of the column signal lines; power wiring that is connected to the column amplifier units; and ground wiring that is connected to the column amplifier units, wherein the power wiring and the ground wiring are exclusively used for the column amplifier units, and a ratio between a wiring resistance of the power wiring and a wiring resistance of the ground wiring is equal to a ratio between a conductance in a case where the power wiring is seen from an output signal of each of the column amplifier units and a conductance in a case where the ground wiring is seen from the output signal of each of the column amplifier units.

According to this structure, even when the amplified signal greatly changes in voltage, a current fluctuation (denoted by $\alpha$) entering into an adjacent column amplifier unit via the constant current circuit and the power wiring and a current fluctuation (denoted by $-\alpha$) entering into the adjacent column amplifier unit via the amplifier circuit and the ground wiring cancel each other out. Accordingly, horizontal streak noise and horizontal streak shading can be suppressed. In other words, when an amplified signal of the adjacent column amplifier unit increases in potential due to the current fluctuation ($\alpha$) entering into the adjacent column amplifier unit via the power wiring (where an amount of voltage increase is denoted by $\beta$), the amplified signal of the adjacent column amplifier unit also decreases in potential due to the current fluctuation ($-\alpha$) entering into the adjacent column amplifier unit via the ground wiring (where an amount of voltage decrease is $\beta$), so that the amplified signal of the adjacent column amplifier unit can be kept from being affected by the voltage change.

A driving method for the solid-state imaging device and a camera including the solid-state imaging device according to the present invention have the same structures and effects as above.

According to the present invention, horizontal streaking can be prevented reliably. Moreover, each column amplifier unit can be formed by a smaller number of circuit elements.

FURTHER INFORMATION ABOUT TECHNICAL BACKGROUND TO THIS APPLICATION

The disclosure of Japanese Patent Application No. 2007-111073 filed on Apr. 19, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

NUMERICAL REFERENCES

Figure 1:
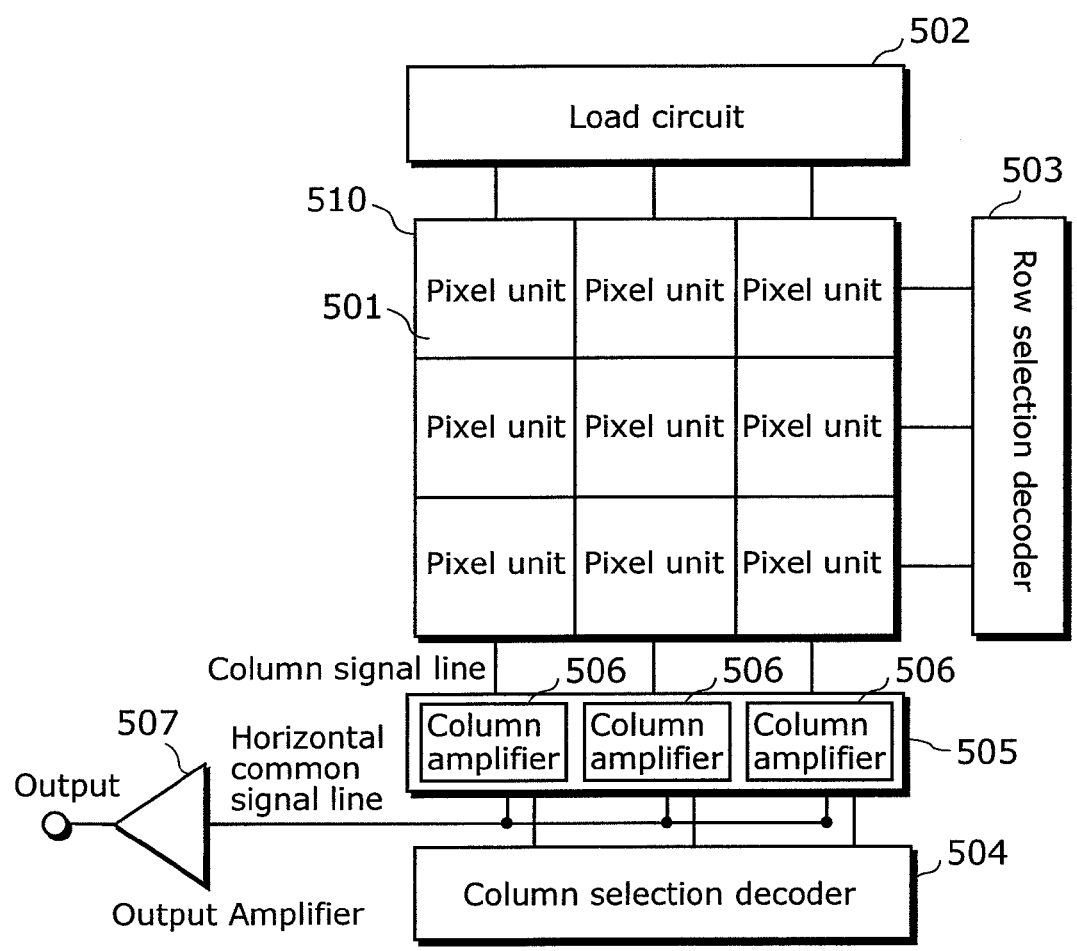
FIG. 1 is a block diagram showing a structure of a solid-state imaging device according to a conventional technique.
Figure 2:
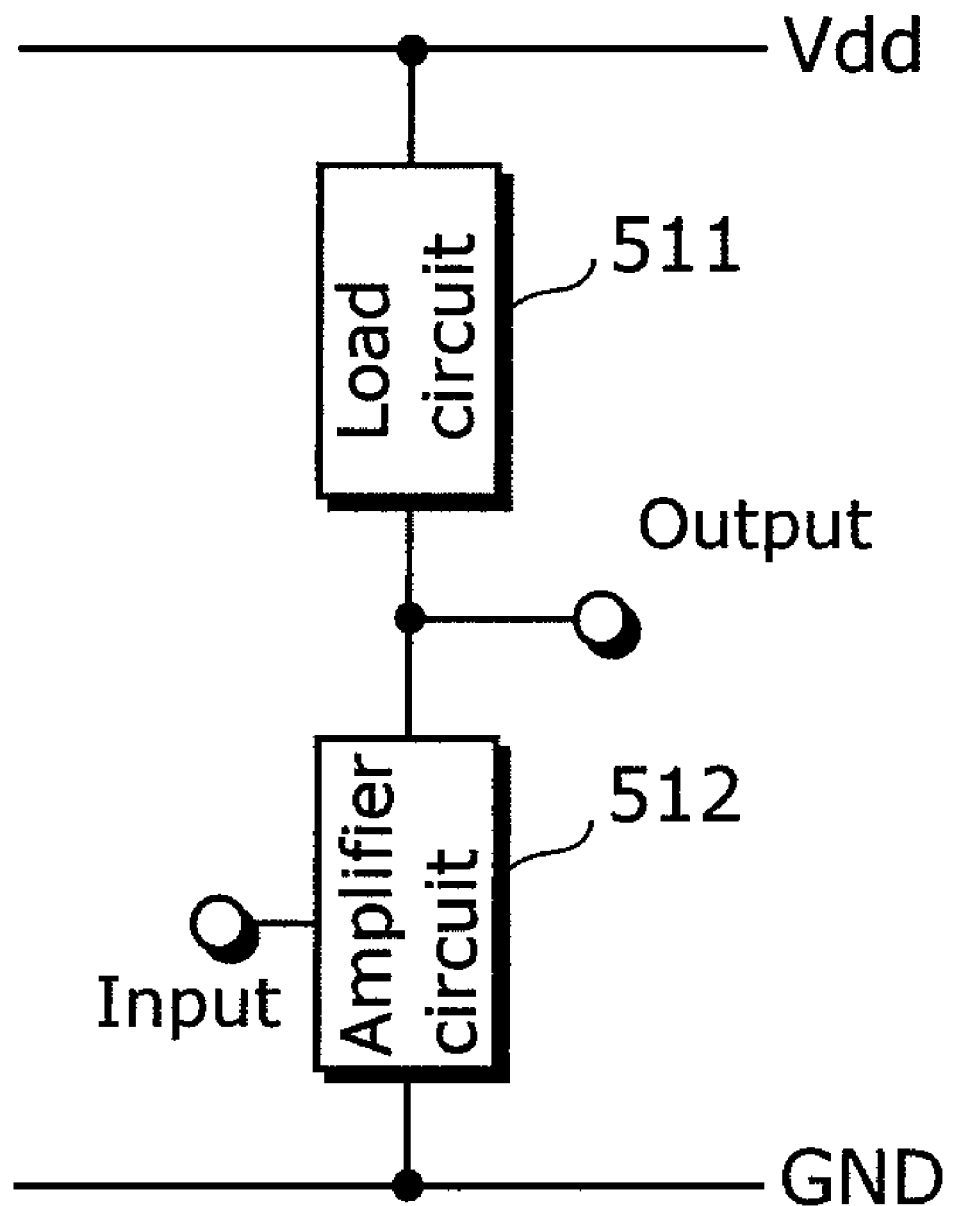
FIG. 2 shows a circuit of a column amplifier according to the conventional technique.
Figure 3B:
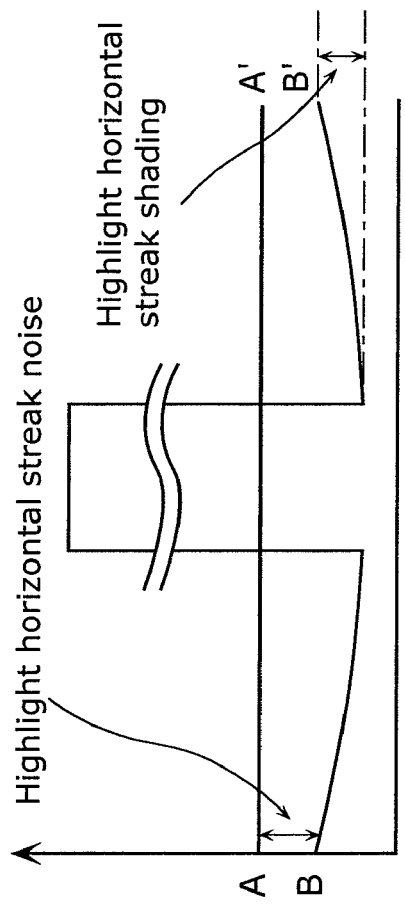
FIG. 3B shows a state of horizontal streaking.
Figure 3A:
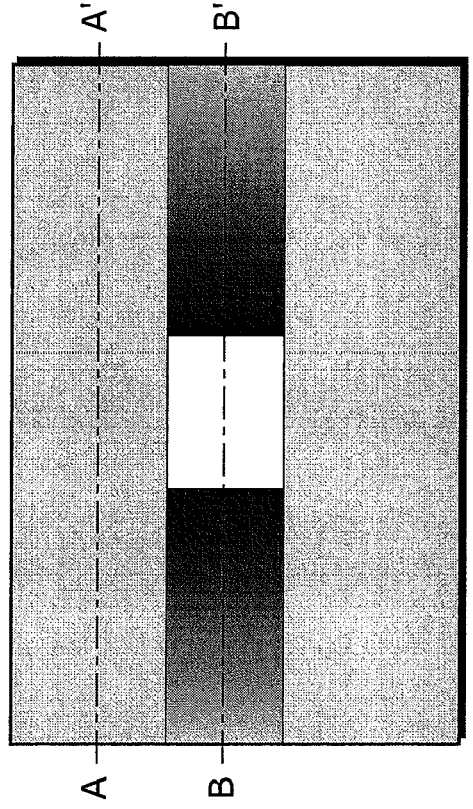
FIG. 3A shows an example image where horizontal streaking appears.
Figure 4:
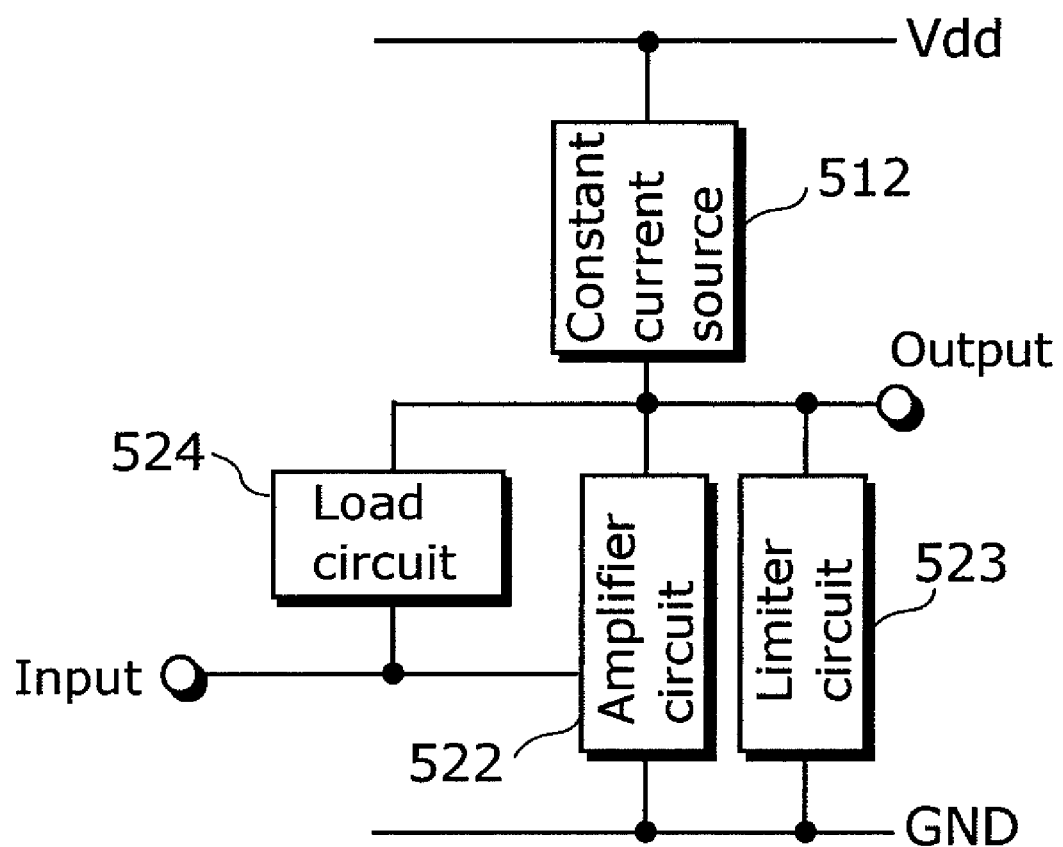
FIG. 4 shows a circuit of a column amplifier according to a conventional technique.

1: constant current circuit
2: amplifier circuit
3: resistor circuit
101: pixel unit
102: load circuit
103: row selection decoder
104: column selection decoder
105, 105a, 105b, 105c: signal processing unit
106, 106a column amplifier
107: output unit
110: imaging area
201, 201a, 201b: bias circuit
301: D control circuit
302: constant current supply unit
303: load circuit
401: suppressor circuit
402, 402a: column CDS circuit
R1: resistor element
pT1-pT4, pT10, pT11: PMOS transistor
nT1-nT3: nMOS transistor
LT1: first load nMOS transistor
LT2: second load nMOS transistor
VE1, VE2: variable voltage source
LT10: load nMOS transistor
LT11: second load nMOS transistor
Tr1: constant current transistor
Tr2, Tr21: amplifier transistor
Tr3, Tr31: resistor transistor

DESCRIPTION OF THE PREFERRED EMBODIMENT(S)

First Embodiment

A solid-state imaging device according to a first embodiment of the present invention includes column amplifiers that are each provided for a different one of column signal lines. Each of the column amplifiers includes: a constant current circuit that supplies a constant current; an amplifier circuit that is connected in series with the constant current circuit, and amplifies a pixel signal from a corresponding column signal line and outputs the amplified signal from a point of connection with the constant current circuit; and a resistor circuit that is connected in parallel with the amplifier circuit and has a constant resistance. The current supplied from the constant current circuit is divided into a first current flowing through the amplifier circuit and a second current flowing through the resistor circuit, and a sum of the first current and the second current is constant even when the amplified signal changes in voltage. As a result, a fluctuation in current flowing in the column amplifier can be suppressed reliably, with it being possible to prevent horizontal streaking. Also, since there is no need to use a circuit for removing switching noise (such as a conventional regulated cascode), the column amplifier can be formed by a smaller number of circuit elements.

Figure 5:
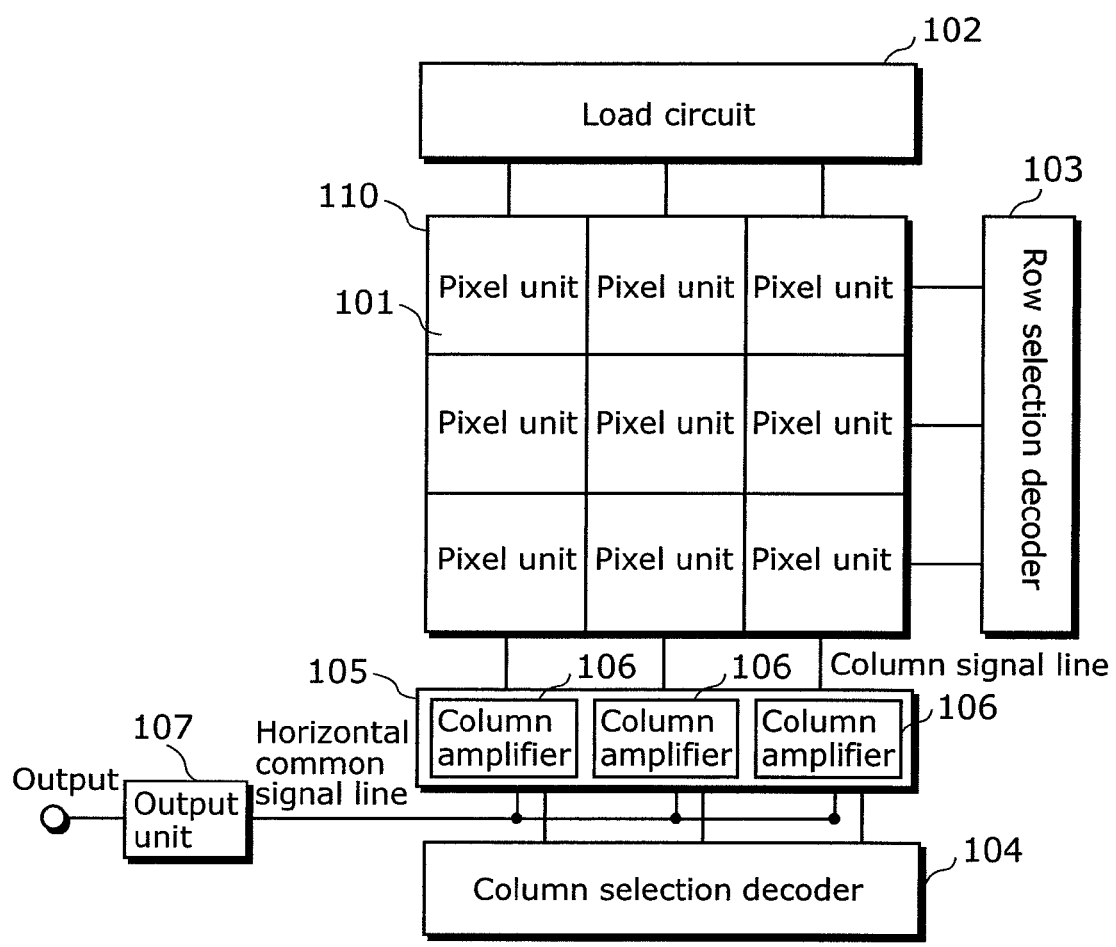
FIG. 5 is a block diagram showing a structure of a solid-state imaging device according to a first embodiment of the present invention.

FIG. 5 is a block diagram showing a structure of the solid-state imaging device according to this embodiment. This solid-state imaging device is an amplifier-type MOS image sensor, and includes an imaging area 110 made up of a plurality of pixel units 101 arranged in a matrix, a load circuit 102, a row selection decoder 103, a column selection decoder 104, a signal processing unit 105 made up of a plurality of column amplifiers 106, and an output unit 107. Each column signal line carries a pixel signal of a pixel unit selected by the row selection decoder 103, from among pixel signals of pixel units connected to a corresponding column. Each column amplifier 106 amplifies a pixel signal from a corresponding column signal line. A horizontal common signal line carries, to the output unit 107, an amplified signal selected by the column selection decoder 104 from among amplified signals of the plurality of column amplifiers 106.

Figure 6:
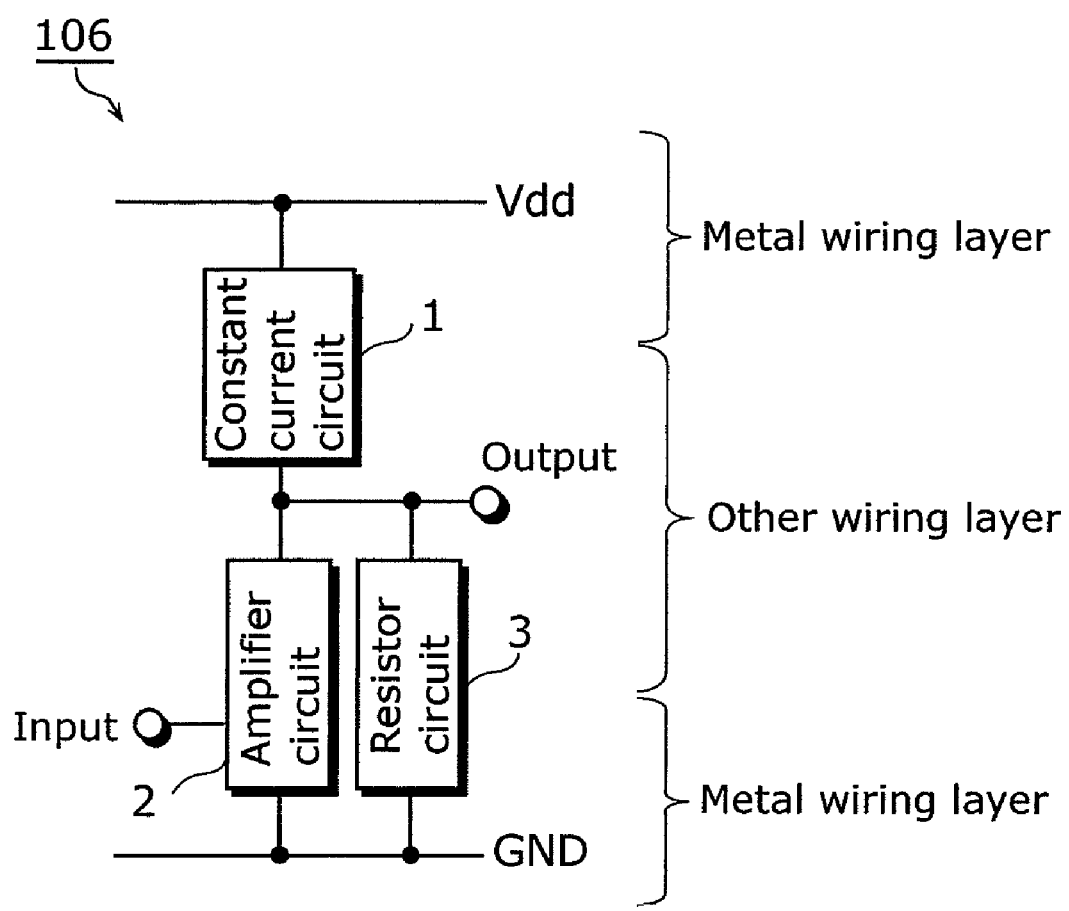
FIG. 6 shows a rough structure of a column amplifier shown in FIG. 5.

FIG. 6 shows a rough structure of each column amplifier 106. In FIG. 6, the column amplifier 106 includes: a constant current circuit 1 that supplies a constant current; an amplifier circuit 2 that is connected in series with the constant current circuit 1, and amplifies a pixel signal from a corresponding column signal line and outputs the amplified signal from a point of connection with the constant current circuit 1; and a resistor circuit 3 that is connected in parallel with the amplifier circuit 2 and has a constant resistance.

A change in voltage of the amplified signal is also a change in voltage applied to the resistor circuit 3. Accordingly, a current fluctuation of the resistor circuit 3 and a current fluctuation of the amplifier circuit 2 cancel each other out. In other words, the amplifier circuit 2 and the resistor circuit 3 have mutually folded currents in accordance with the voltage change of the amplified signal. Because of this folding, the sum of the first current and the second current remains unchanged, so that a current fluctuation of the column amplifier 106 can be prevented reliably.

Figure 7:
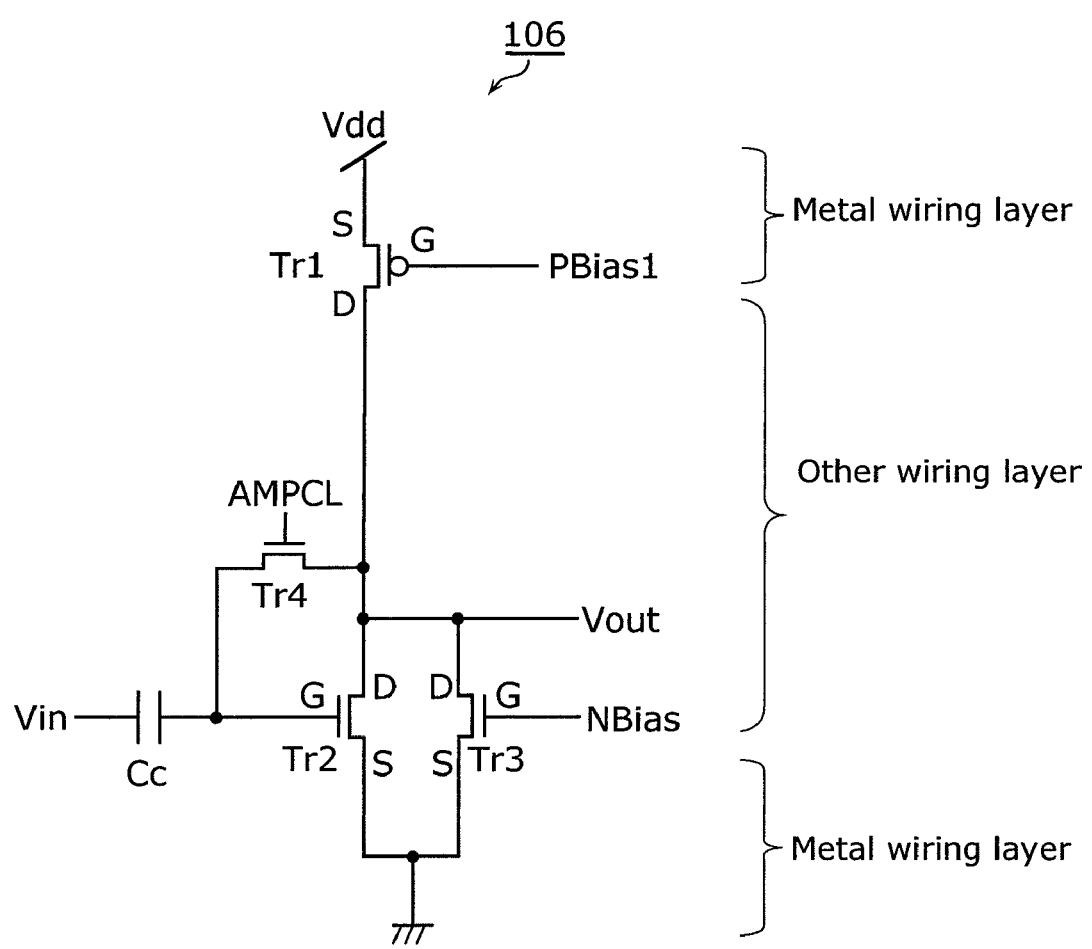
FIG. 7 shows a circuit example of the column amplifier.

FIG. 7 shows a circuit example of the column amplifier 106. In FIG. 7, the column amplifier 106 includes a constant current transistor Tr1 as the constant current circuit 1, an amplifier transistor Tr2 as the amplifier circuit 2, and a linear resistor transistor Tr3 as the resistor circuit 3. FIG. 7 also shows a clamp capacitor Cc and a clamp transistor Tr4.

The constant current transistor Tr1 is a pMOS transistor having a source connected to wiring of a power supply Vdd, a gate to which first bias voltage PBias1 is applied, and a drain connected to a drain of the amplifier transistor Tr2. The constant current transistor Tr1 functions as a constant current supply.

The amplifier transistor Tr2 has a gate to which pixel signal Vin is inputted, a source connected to a ground, and a drain connected to the drain of the constant current transistor Tr1. The amplifier transistor Tr2 outputs an amplified signal from the drain, as output signal Vout.

The linear resistor transistor Tr3 has a source connected to the ground, a gate to which bias voltage NBias is applied, and a drain connected to output signal Vout. Bias signal NBias is a voltage for setting a linear region (non-saturation region) as an operating point. The linear resistor transistor Tr3 functions as a resistor by operating in a linear region. Thus, the amplifier transistor Tr2 and the linear resistor transistor Tr3 perform the above folding operation.

It should be noted here that a metal wiring layer including power wiring and ground wiring is located above a wiring layer including wiring that connects the amplifier circuit 2 and the resistor circuit 3.

Figure 8:
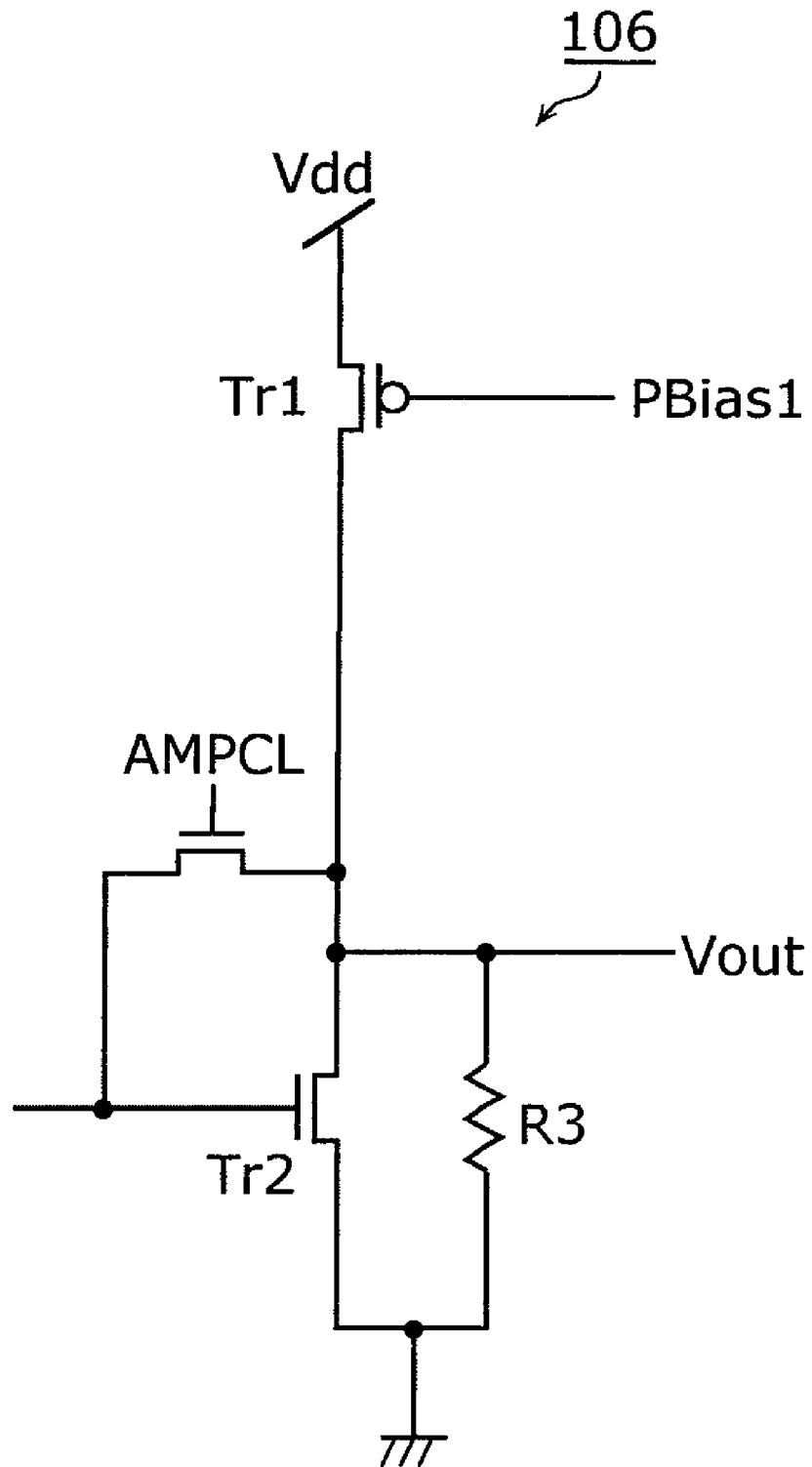
FIG. 8 shows an equivalent circuit of the column amplifier.

FIG. 8 shows an equivalent circuit of the column amplifier 106. As shown in FIG. 8, the linear resistor transistor Tr3 functions as a resistor element having a constant resistance.

As described above, according to the solid-state imaging device in this embodiment, horizontal streaking can be prevented reliably, and also the column amplifier can be formed by a smaller number of circuit elements.

Figure 9:
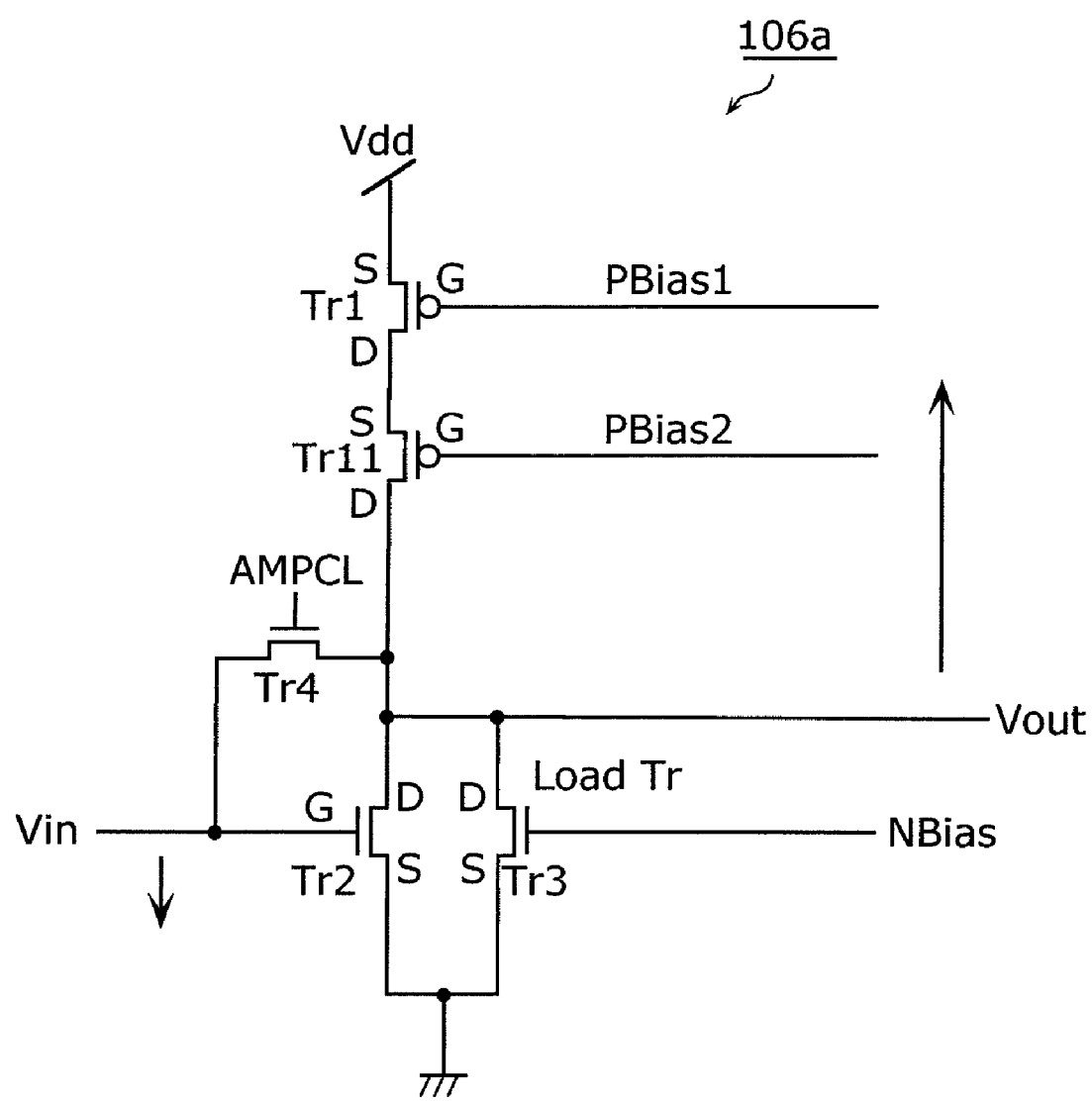
FIG. 9 shows a variation of the column amplifier.

FIG. 9 shows a variation of the column amplifier. A column amplifier 106a shown in FIG. 9 differs from the column amplifier 106 shown in FIG. 7, in that a constant current transistor Tr11 is added. The following mainly describes this difference, while omitting an explanation of the same parts as FIG. 7. The constant current transistor Tr11 is a pMOS transistor, and is cascode-connected with the constant current transistor Tr1. This cascode connection of the two pMOS transistors Tr1 and Tr11 increases an output impedance. As a result, the constant current can be maintained more stably, even when the amplified signal changes in amplitude.

Second Embodiment

A second embodiment of the present invention relates to a solid-state imaging device that optimally controls the amount of constant current flowing in each column amplifier, by supplying first bias voltage PBias1 and second bias voltage PBias2 to the gates of the pMOS transistors in the constant current circuit 1. The second embodiment also relates to a solid-state imaging device that maximizes a dynamic range of the amplifier circuit 2.

Figure 10:
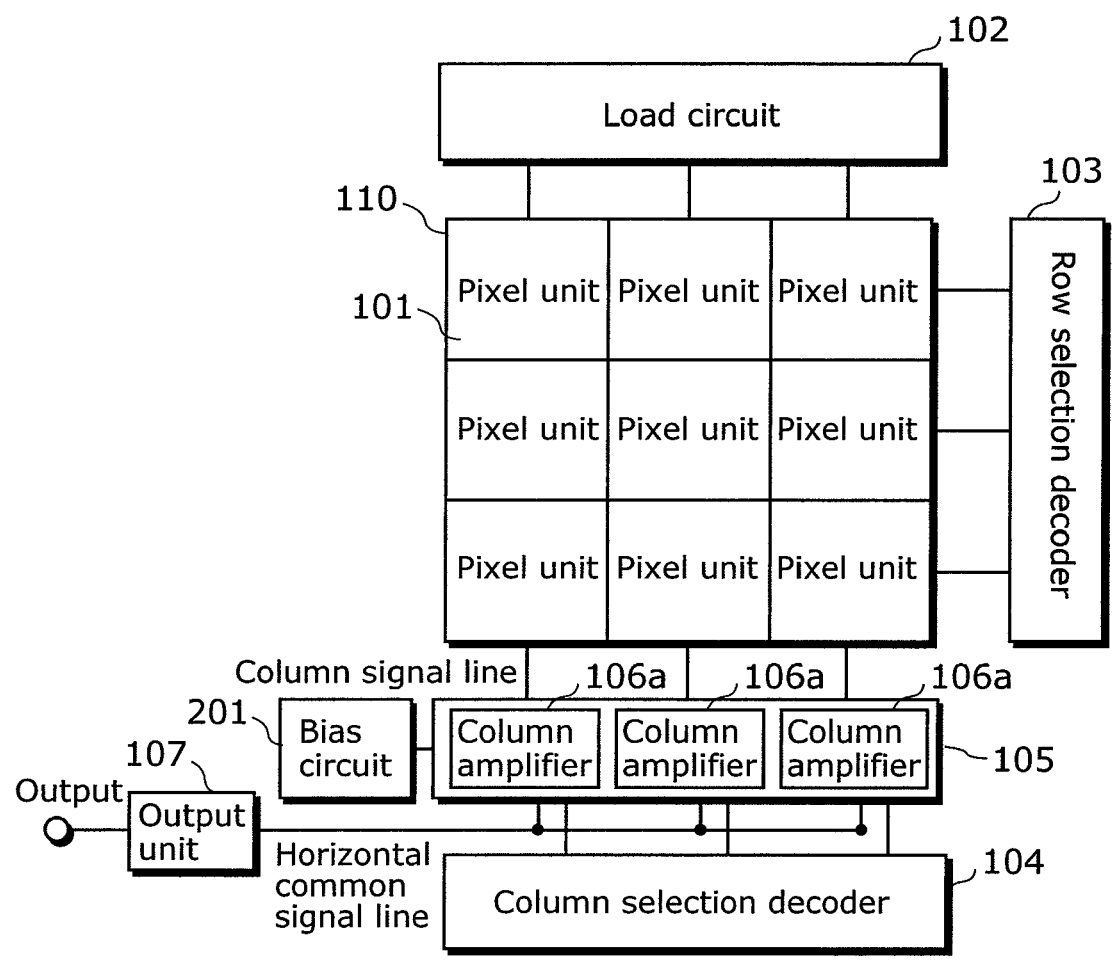
FIG. 10 is a block diagram showing a structure of a solid-state imaging device according to a second embodiment of the present invention.

FIG. 10 is a block diagram showing a structure of a solid-state imaging device according to this embodiment. FIG. 10 differs from FIG. 5 in that the column amplifiers 106 are replaced by column amplifiers 106a and a bias circuit 201 is added. The following mainly describes this difference, while omitting an explanation of the same parts as FIG. 5. Note that the column amplifiers 106a have already been described with reference to FIG. 9.

Figure 11:
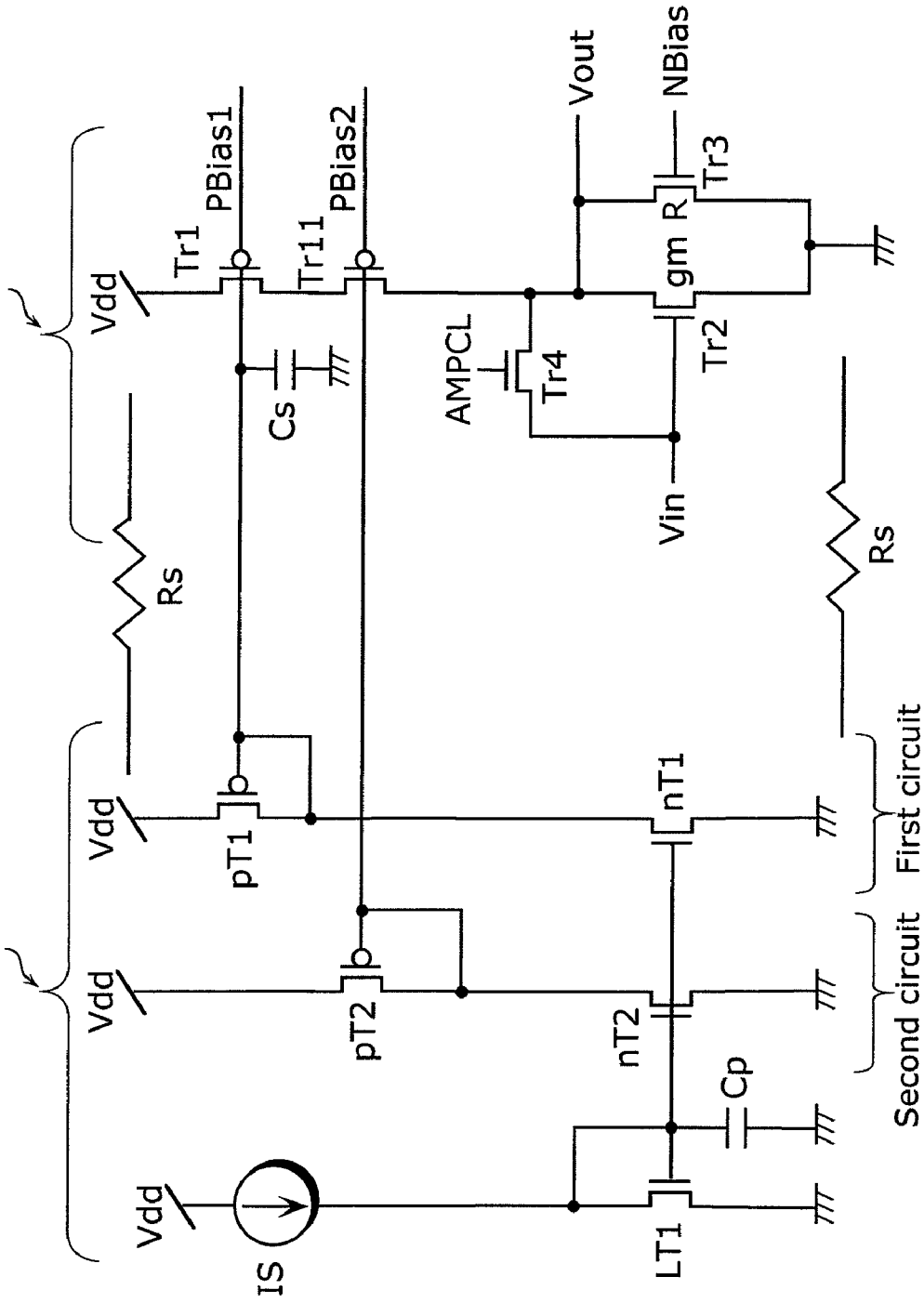
FIG. 11 shows a bias circuit and a column amplifier shown in FIG. 10.

FIG. 11 shows the bias circuit 201 and one of the column amplifiers 106a shown in FIG. 10. FIG. 11 also shows parasitic resistance Rs of the power wiring and the ground wiring and parasitic capacitance Cs of bias wiring.

The bias circuit 201 includes a first load nMOS transistor LT1, a first circuit, and a second circuit. The first load nMOS transistor LT1 has a drain connected to a constant current source IS, a gate short-circuited with the drain, and a source connected to the ground. The first circuit forms a current mirror with the first load nMOS transistor LT1. The second circuit forms a current mirror with the first load nMOS transistor LT1.

The first circuit supplies first bias voltage PBias1 to the gate of the PMOS transistor Tr1 in each column amplifier 106a. To do so, the first circuit includes a first pMOS transistor pT1 and a first nMOS transistor nT1. The first pMOS transistor pT1 has a drain and a gate short-circuited, and a source connected to the power wiring. The drain of the first pMOS transistor pT1, which outputs first bias voltage PBias1, is connected to the gate of the pMOS transistor Tr1 in each column amplifier 106a. The first nMOS transistor nT1 has a drain connected to the drain of the first pMOS transistor pT1, a gate connected to the gate of the first load nMOS transistor LT1, and a source connected to the ground.

The second circuit supplies second bias voltage PBias2 to the gate of the pMOS transistor Tr11 in each column amplifier 106a. To do so, the second circuit includes a second pMOS transistor pT2 and a second nMOS transistor nT2. The second PMOS transistor pT2 has a drain and a gate short-circuited, and a source connected to the power wiring. The drain of the second PMOS transistor pT2, which outputs second bias voltage PBias2, is connected to the gate of the pMOS transistor Tr11 in each column amplifier 106a. The second nMOS transistor nT2 has a drain connected to the drain of the second PMOS transistor pT2, a gate connected to the gate of the first load nMOS transistor LT1, and a source connected to the ground.

On a semiconductor substrate on which the solid-state imaging device is formed, a length-width ratio of a region of the amplifier transistor Tr2 in each column amplifier 106a is equal to that of the first load nMOS transistor LT1. Also, length-width ratios of regions of the pMOS transistors Tr1 and Tr11 in each column amplifier 106a are equal to those of the first and second pMOS transistors pT1 and pT2, respectively.

In this way, even when characteristic variations exist between solid-state imaging devices due to manufacturing, in each individual solid-state imaging device the MOS transistor as the amplifier transistor Tr2 shows a same characteristic as the first load nMOS transistor LT1, so that the amplifier transistor Tr2 can ensure an operating point of favorable linearity. Accordingly, a wider input/output dynamic range of the amplifier transistor Tr2 can be achieved.

Moreover, the length-width ratio of the region of the amplifier transistor Tr2 in each column amplifier 106a is equal to those of the first nMOS transistor nT1 and the second nMOS transistor nT2. In this case too, in each individual solid-state imaging device the MOS transistor as the amplifier transistor Tr2 shows a same characteristic as the first nMOS transistor nT1 and the second nMOS transistor nT2. Accordingly, even when characteristic variations exist between solid-state imaging devices due to manufacturing, the correlation between a current of each of the first circuit and the second circuit and a current of the amplifier transistor Tr2 is unaffected. Hence the amplifier circuit 2 can ensure an operating point of favorable linearity. This contributes to a wider input/output dynamic range of the amplifier transistor Tr2, too.

It is to be noted here that, since the first load nMOS transistor LT1, the first nMOS transistor nT1, and the second nMOS transistor nT2 form a current mirror, regions where these transistors are formed have a same length and a same width.

Figure 12:
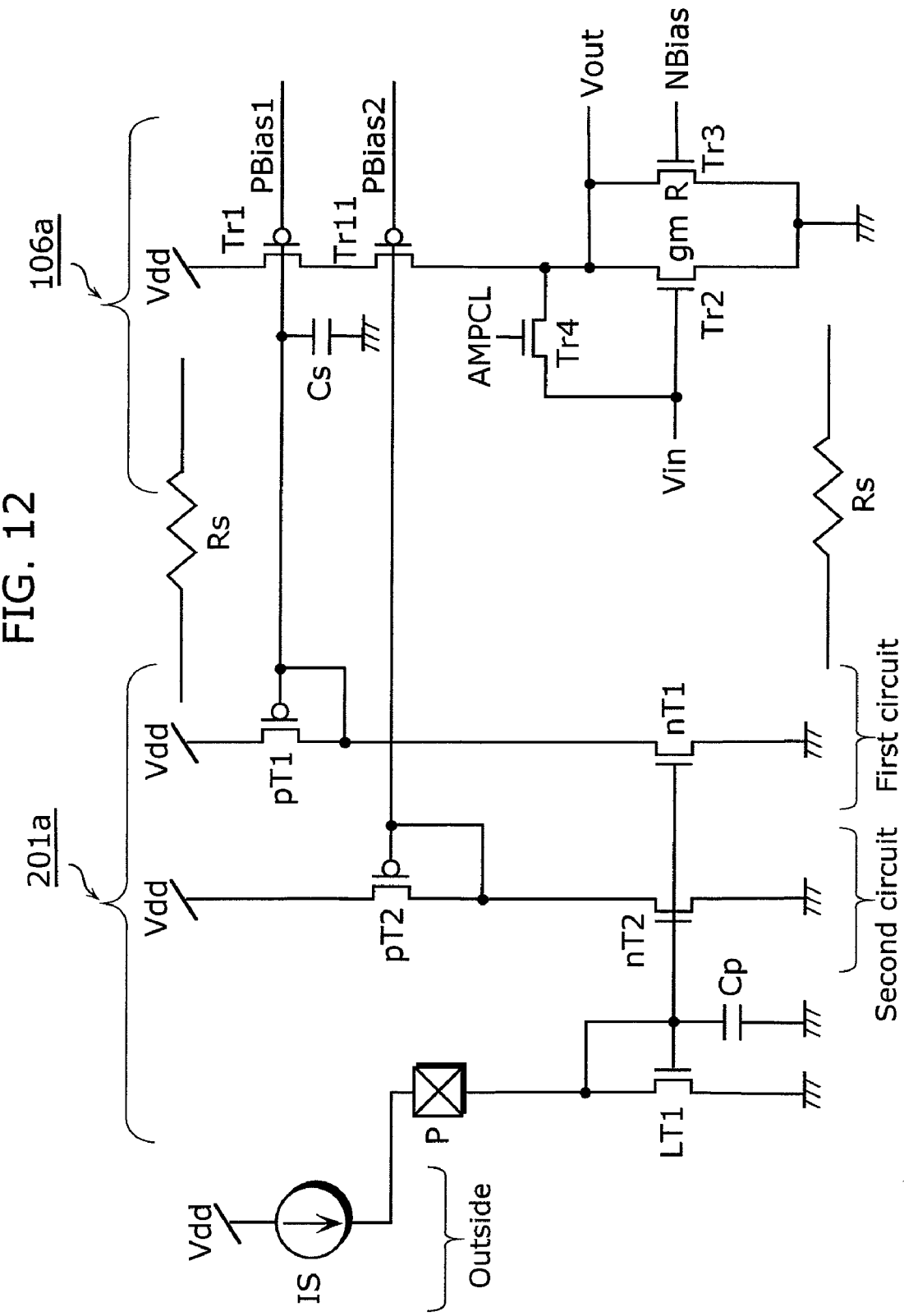
FIG. 12 shows a first variation of the bias circuit and the column amplifier.

FIG. 12 shows a first variation of the bias circuit and the column amplifier. FIG. 12 differs from FIG. 11 in that a bias circuit 201a does not include the constant current source IS, and a pad P connected to an external constant current source is connected to the drain of the first load nMOS transistor LT1.

According to this structure, the constant current is supplied from the current source outside the chip of the solid-state imaging device. This allows a necessary amount of constant current to be supplied stably. As a result, each column amplifier 106a can obtain a stable constant current, irrespective of characteristic variations between solid-state imaging devices due to manufacturing. Furthermore, the solid-state imaging device can be simplified in structure and reduced in size.

Note here that in the case of providing the constant current source IS within the chip of the solid-state imaging device as in FIG. 11, more stability can be attained because an internal transistor characteristic changes in a same manner as a transistor characteristic in the current source IS.

Figure 13:
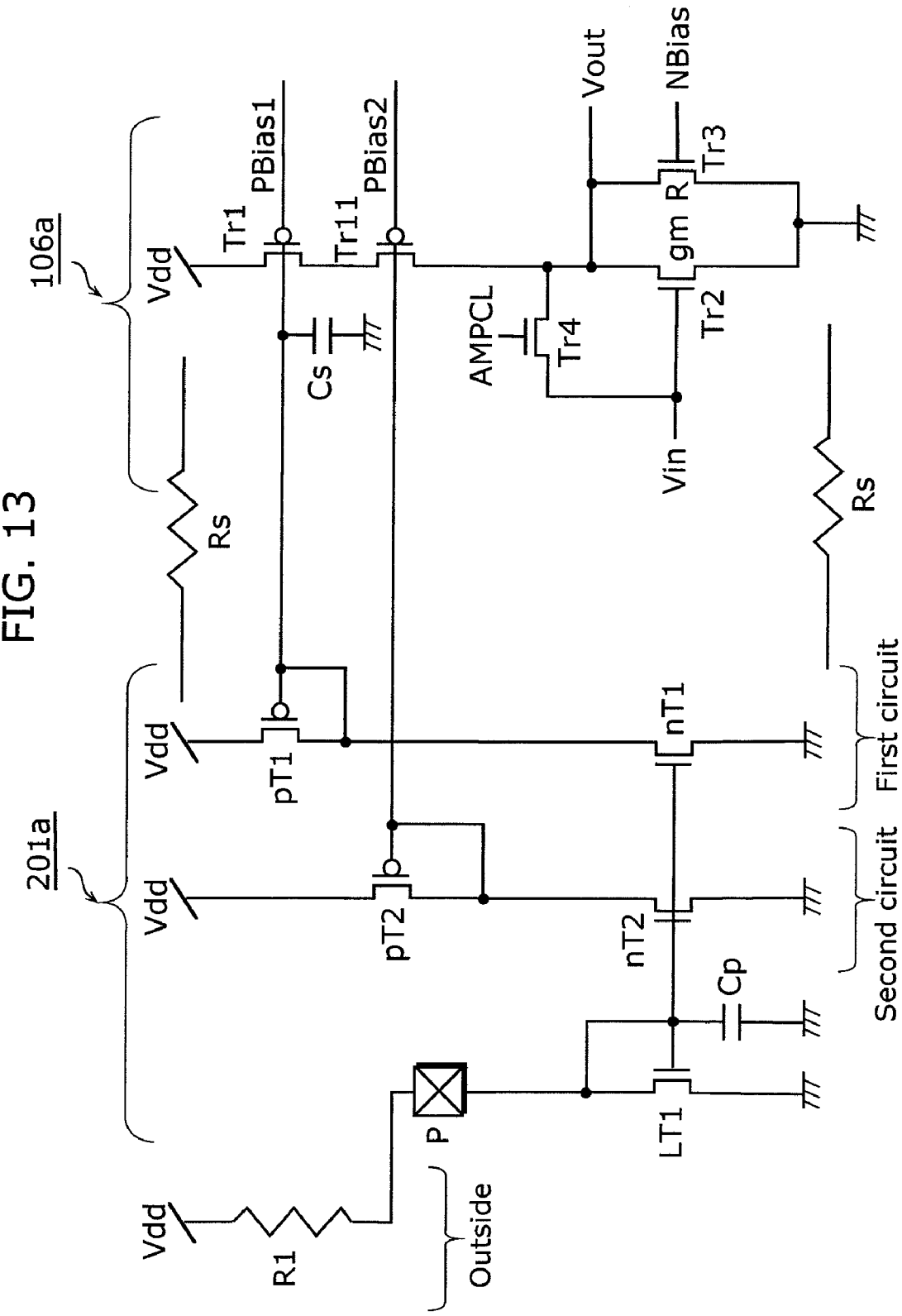
FIG. 13 shows a second variation of the bias circuit and the column amplifier.

FIG. 13 shows a second variation of the bias circuit and the column amplifier. FIG. 13 differs from FIG. 12 in that a resistor element R1 is provided as the external constant current source.

The resistor element R1 preferably has a high accuracy (for example, equal to or smaller than 1% in error). When the resistor element R1 has a high accuracy, the solid-state imaging device can be further simplified in structure and reduced in size.

Figure 14:
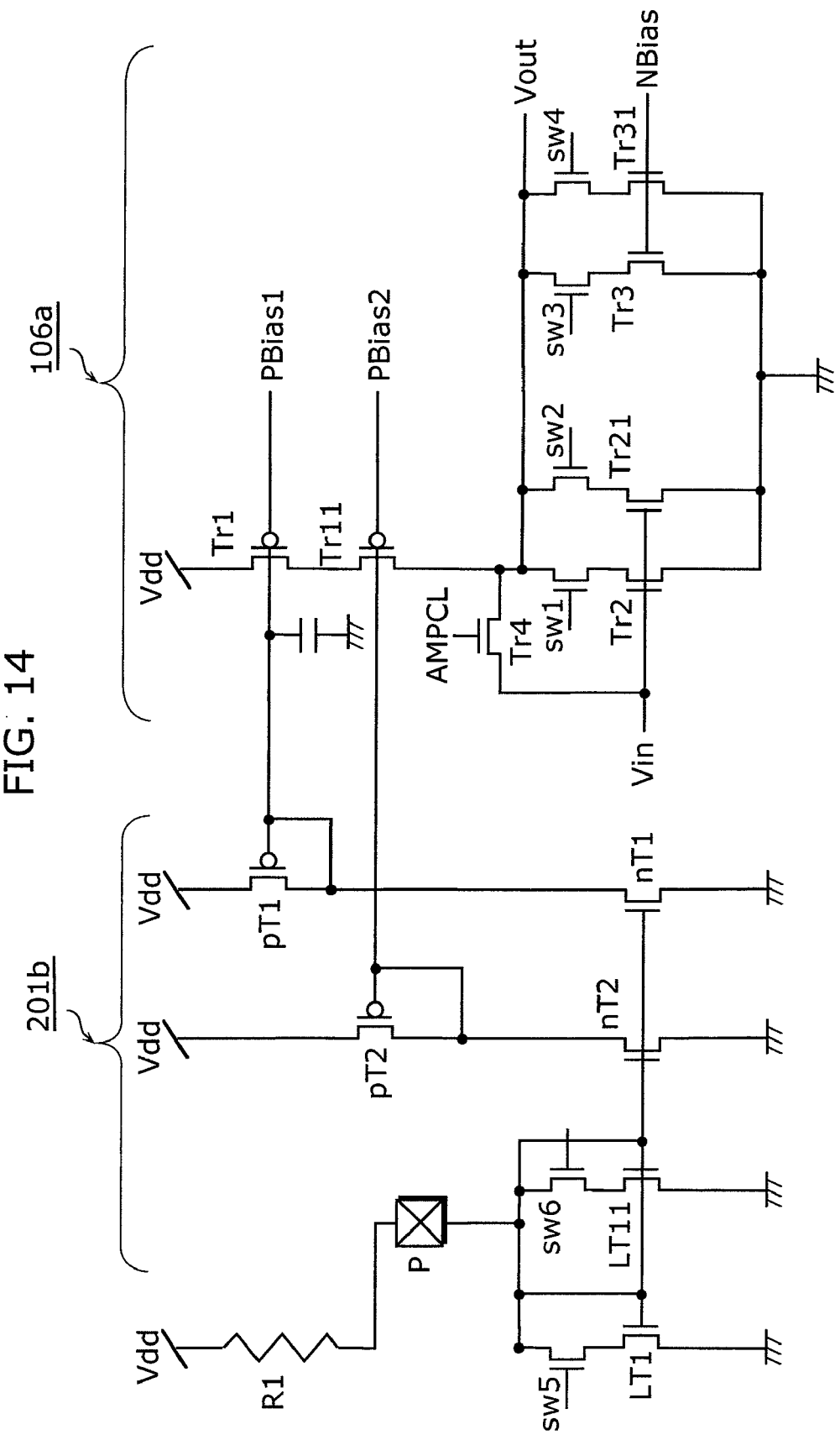
FIG. 14 shows a third variation of the bias circuit and the column amplifier.

FIG. 14 shows a third variation of the bias circuit and the column amplifier. This variation relates to a structure capable of switching a gain of the amplifier circuit 2.

FIG. 14 differs from FIG. 13 in that first to sixth switches sw1 to sw6, a second amplifier transistor Tr21, a second resistor transistor Tr31, and a second load nMOS transistor LT11 are added. The following mainly describes this difference, while omitting an explanation of the same parts as FIG. 13.

The first switch sw1 is inserted between the drain of the amplifier transistor Tr2 and a signal line of output signal Vout. The second switch sw2 is inserted between a drain of the amplifier transistor Tr21 and the signal line of output signal Vout.

The third switch sw3 is inserted between the drain of the resistor transistor Tr3 and the signal line of output signal Vout. The fourth switch sw4 is inserted between a drain of the resistor transistor Tr31 and the signal line of output signal Vout.

The fifth switch sw5 is inserted between the drain of the first load nMOS transistor LT1 and the pad P. The sixth switch sw6 is inserted between a drain of the second load nMOS transistor LT11 and the pad P.

The first switch sw1, the third switch sw3, and the fifth switch sw5 turn ON or OFF in conjunction with each other. The second switch sw2, the fourth switch sw4, and the sixth switch sw6 turn ON or OFF in conjunction with each other.

The amplifier transistor Tr21 has a smaller gain than the amplifier transistor Tr2. The amplifier transistor Tr21 has the drain connected to the drain of the amplifier transistor Tr2 via the second switch sw2, a gate to which the pixel signal is inputted, and a source connected to the ground. The amplifier transistor Tr21 outputs the amplified signal from the drain.

The resistor transistor Tr31 has a smaller resistance than the resistor transistor Tr3. The resistor transistor Tr31 has the drain connected to the drain of the amplifier transistor Tr2 via the fourth switch sw4, and a gate to which bias voltage NBias corresponding to a linear region is applied.

The second load nMOS transistor LT11 has a smaller gain than the first load nMOS transistor LT1. The second load nMOS transistor LT11 has the drain connected to the constant current source via the sixth switch sw6, a gate connected with the drain, and a source connected to the ground.

According to this structure, it is possible to switch the gain of the amplifier circuit 2 including the amplifier transistors Tr2 and Tr21. In detail, the gain is large when the first switch sw1, the third switch sw3, and the fifth switch sw5 are ON, and small when the second switch sw2, the fourth switch sw4, and the sixth switch sw6 are ON.

Also, the first and second bias voltages applied to the gates of the constant current transistors Tr1 and Tr11 are switched simultaneously with the switching of the gain of the amplifier circuit 2. As a result, the amplifier circuit 2 can ensure an operating point of favorable linearity.

Though the drain and the gate of the first load nMOS transistor LT1 are connected to each other via the fifth switch sw5 in the above example, they may instead be connected directly. Likewise, though the drain and the gate of the second load nMOS transistor LT11 are connected to each other via the sixth switch sw6 in the above example, they may instead be connected directly.

Figure 15:
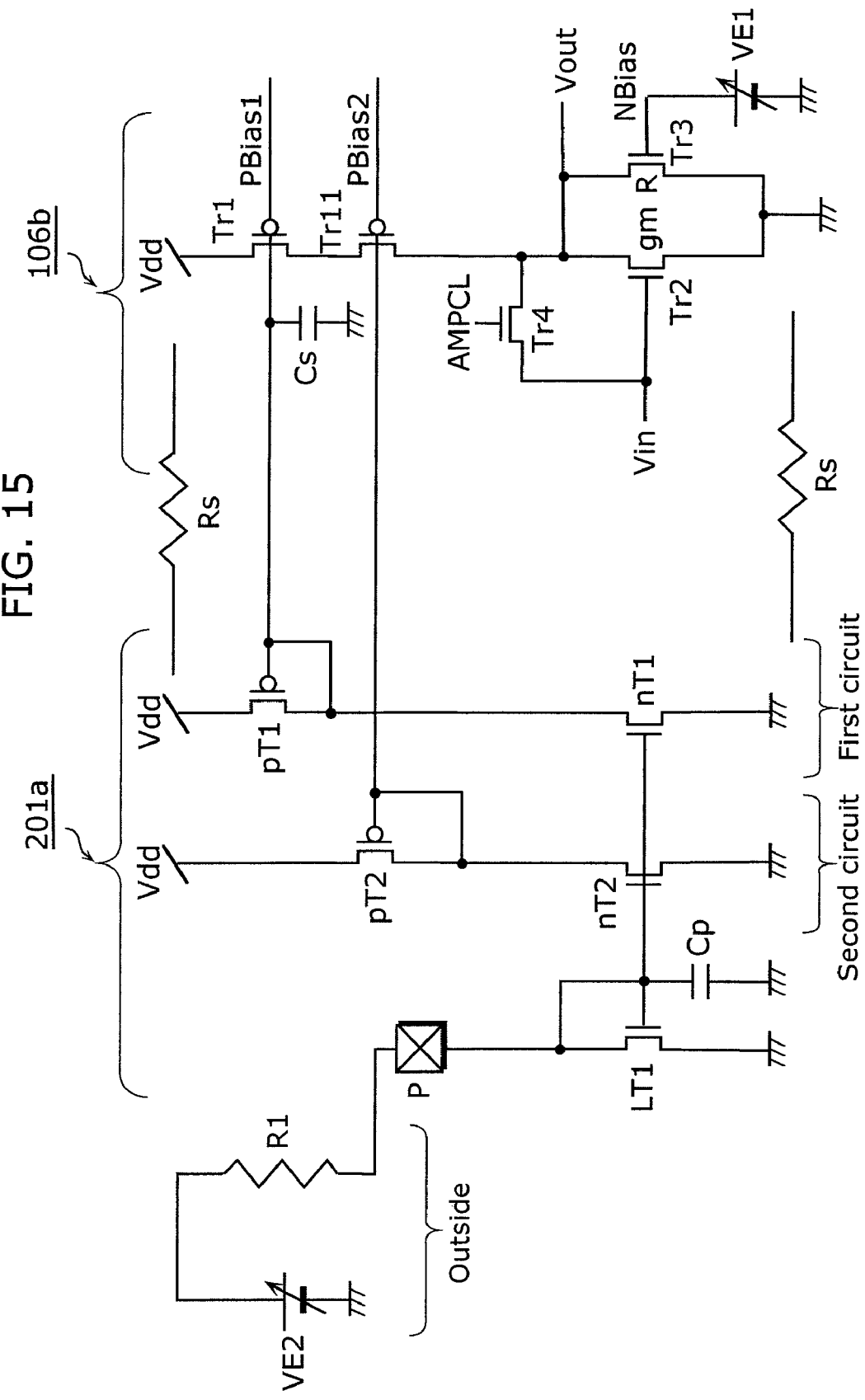
FIG. 15 shows a fourth variation of the bias circuit and the column amplifier.

FIG. 15 shows a fourth variation of the bias circuit and the column amplifier. This variation relates to a structure capable of fine-adjusting the gain of the amplifier circuit 2.

FIG. 15 differs from FIG. 13 in that variable voltage sources VE1 and VE2 are added. The following mainly describes this difference, while omitting an explanation of the same parts as FIG. 13.

The variable voltage source VE1 outputs a variable voltage, and applies the variable voltage to the gate of the resistor transistor Tr3 as bias voltage NBias. In this way, the resistance of the resistor transistor Tr3 can be fine-adjusted.

The variable voltage source VE2 outputs a variable voltage, and applies the variable voltage to the resistor element R1 as a constant current source. In this way, the amount of constant current supplied by the resistor element R1 can be fine-adjusted.

Through these two fine-adjustments by the variable voltage sources VE1 and VE2, even when variations exist between solid-state imaging devices, an optimal operation which accommodates such variations can be realized.

Third Embodiment

A third embodiment of the present invention relates to a solid-state imaging device that prevents horizontal streaking or horizontal banding, by using power wiring and ground wiring exclusively for the signal processing unit 105 including the column amplifiers 106a, and by adjusting a ratio in wiring resistance between the power wiring and the ground wiring. A rough structure of this solid-state imaging device is the same as those shown in FIGS. 5 and 10, and so its explanation has been omitted here.

Figure 16:
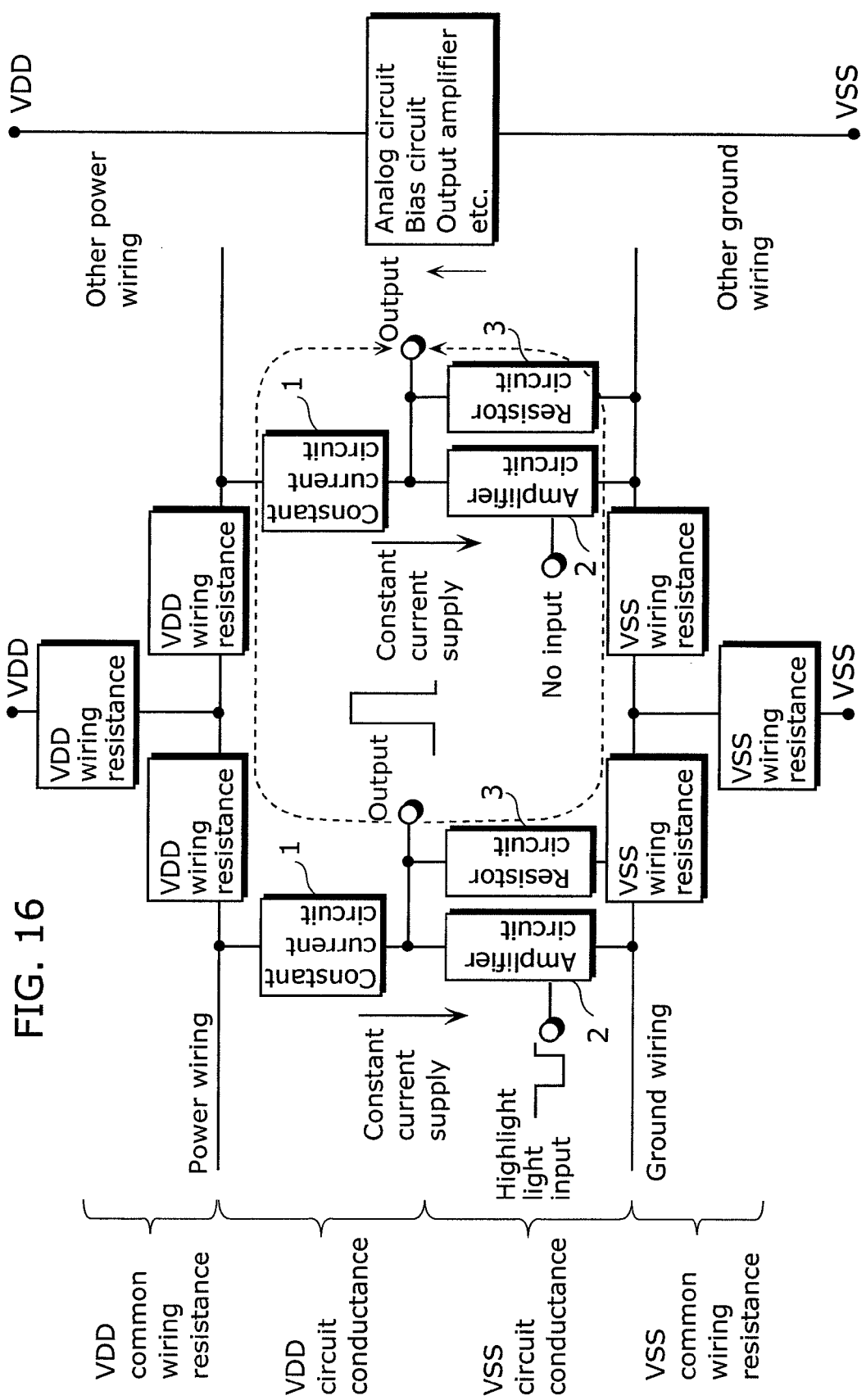
FIG. 16 shows power wiring and ground wiring connected to column amplifiers according to a third embodiment of the present invention.

FIG. 16 shows power wiring and ground wiring to column amplifiers. Two adjacent column amplifiers 106a out of the column amplifiers 106a included in the signal processing unit 105 are shown in FIG. 16.

As shown in FIG. 16, the power wiring is connected to the constant current circuits 1 in the signal processing unit 105, while the ground wiring is connected to the amplifier circuits 2 and the resistor circuits 3 in the signal processing unit 105. The power wiring and the ground wiring are exclusively used for the signal processing unit 105, and are not connected to other circuits (such as an analog circuit, a bias circuit, and an output unit). The power wiring and the ground wiring are, however, connected directly to a power pad and a ground pad. Other power wiring and ground wiring are connected to other circuits.

In FIG. 16, a VDD wiring resistance represents parasitic resistance Rs of the power wiring. A VSS wiring resistance represents parasitic resistance Rs of the ground wiring. FIG. 16 also shows an input signal to the amplifier circuit 2 and an output signal from the amplifier circuit 2 in the case where highlight light enters. When the output signal changes in amplitude, a current fluctuation of the constant current circuit 1 may be suppressed. In the case where the amplitude change is particularly large, however, a current fluctuation can occur. As shown by the dotted arrows in FIG. 16, there are two routes through which the current fluctuation enters into the adjacent column amplifier, that is, a route of entering into the adjacent column amplifier from the constant current circuit 1 through the power wiring, and a route of entering into the adjacent column amplifier from the amplifier circuit 2 or the resistor circuit 3 through the ground wiring. Such entrance affects an output level of the adjacent column amplifier (to increase or decrease), as a result of which horizontal streak noise or horizontal streak shading occurs.

Figure 17:
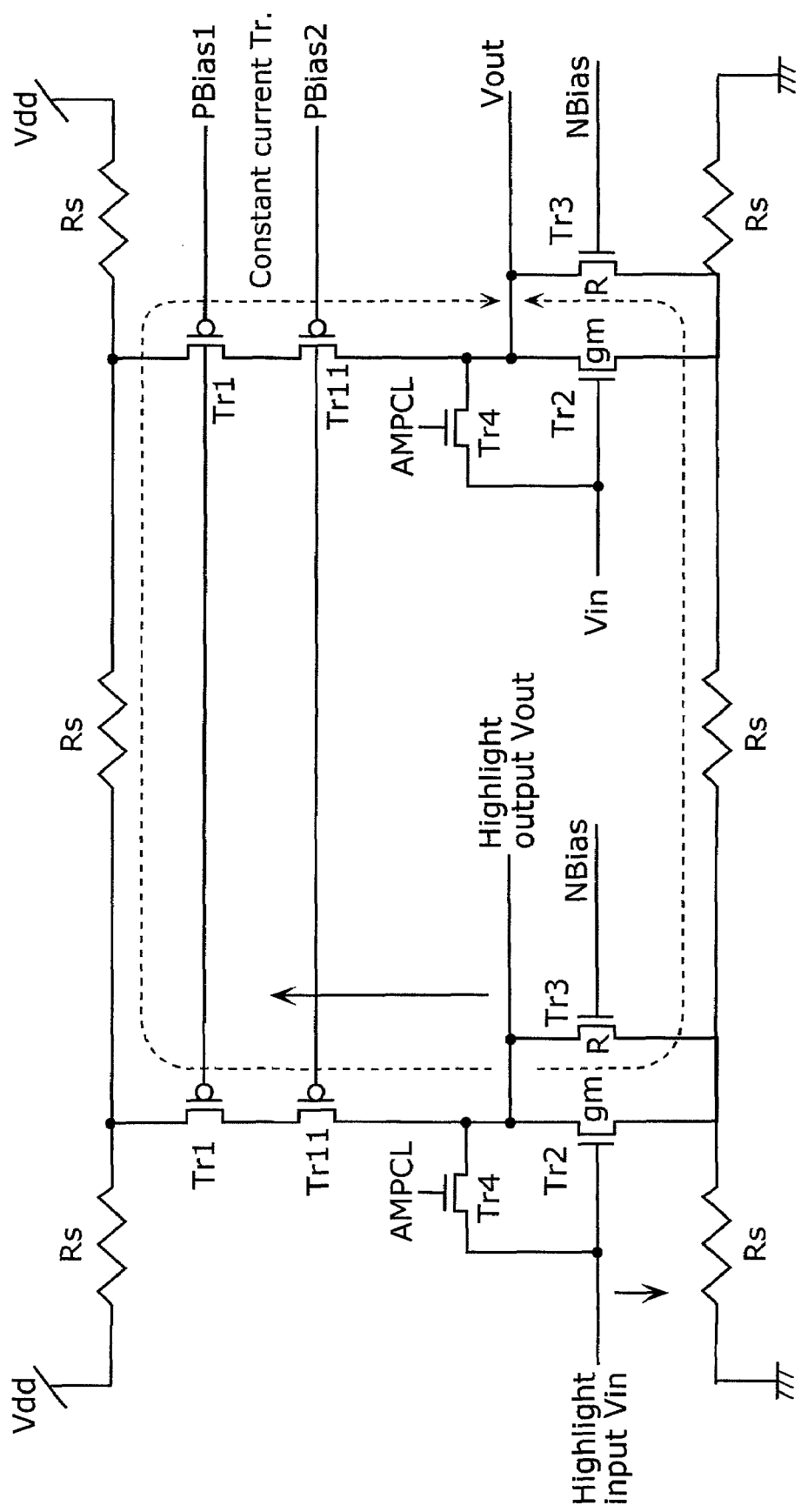
FIG. 17 shows a circuit example of the power wiring and the ground wiring connected to the column amplifiers.

FIG. 17 shows a specific example of current fluctuation entrance. As shown in FIG. 17, on the VSS side the entrance of the current fluctuation occurs mainly via the resistor transistor Tr3 that has a larger conductance than the amplifier transistor Tr2.

To prevent the output level of the adjacent column amplifier from fluctuating due to such entrance, the solid-state imaging device according to this embodiment is structured so that a ratio between the wiring resistance of the power wiring and the wiring resistance of the ground wiring is equal to a ratio between a conductance of the constant current circuit 1 and a conductance of the amplifier circuit 2 and the resistor circuit 3 in the column amplifier 106a.

By doing so, even when the above entrance occurs, the current fluctuation on the VDD side and the current fluctuation on the VSS side are equal and cancel each other out. Accordingly, highlight horizontal streak noise and highlight horizontal streak shading can be prevented.

It is to be noted here that the above conductance ratio is a ratio between a conductance of the circuit on the VDD side (the constant current circuit 1) as seen from the output signal of the amplifier circuit 2 and a conductance of the circuit on the VSS side (the amplifier circuit 2+the resistor circuit 3) as seen from the output signal of the amplifier circuit 2. This ratio is determined by the types of circuit elements and the number of elements, and cannot be altered easily. On the other hand, the wiring resistance ratio is determined by the lengths, widths, materials, and the like of wiring patterns, and so can be set easily by wiring layout design.

Figure 18:
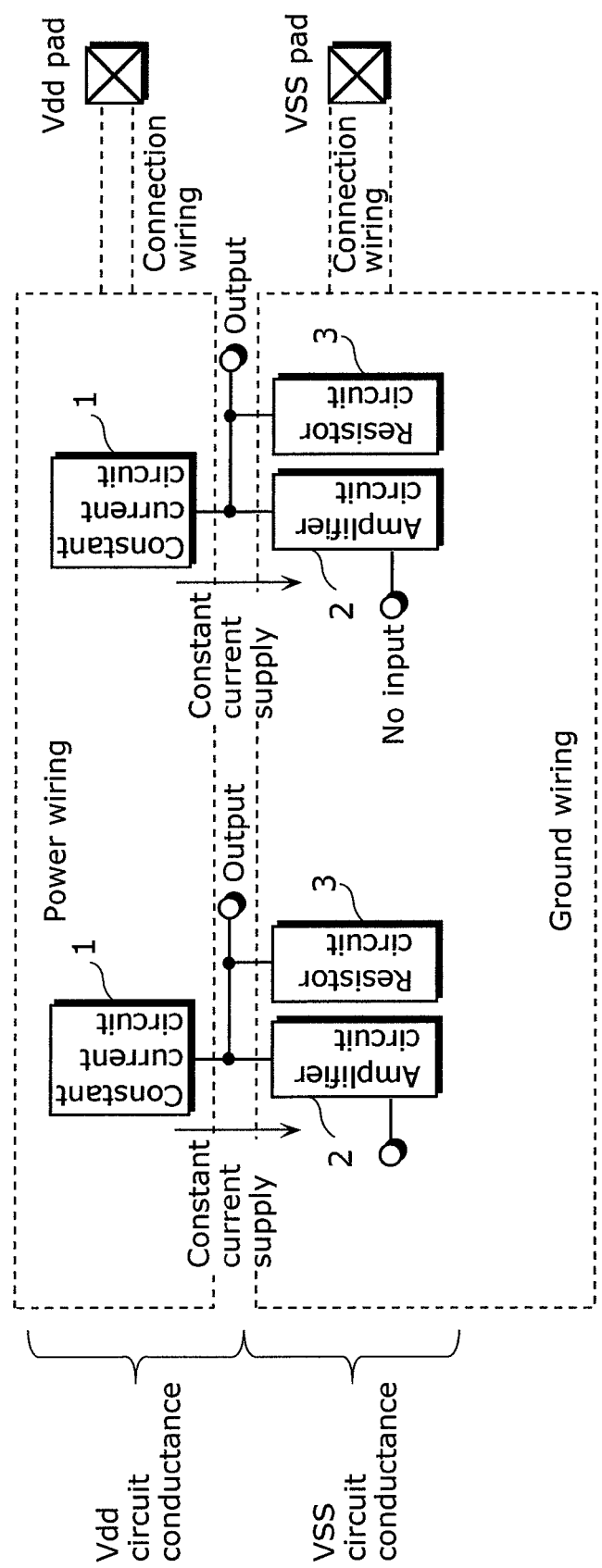
FIG. 18 shows a layout of the power wiring and the ground wiring.

FIG. 18 shows a layout example of the power wiring and the ground wiring. In FIG. 18, the upper dotted box shows a power wiring pattern, whereas the lower dotted box shows a ground wiring pattern. In this example, the power wiring is solid metal wiring formed so as to shield each constant current circuit 1 from light, and the ground wiring is solid metal wiring formed so as to shield each amplifier circuit 2 and each resistor circuit 3 from light.

In this example, the wiring resistance ratio between the power wiring and the ground wiring is determined by the wiring width. In detail, the wiring resistance ratio between the power wiring and the ground wiring is set to about 2:1.

The power wiring and the ground wiring are included in the same metal wiring layer. This metal wiring layer is located above the wiring layer including the wiring that connects the amplifier circuit 2 and the resistor circuit 3, on the semiconductor substrate of the solid-state imaging device.

FIG. 18 also shows connection wiring for connecting the power wiring to the power pad, and connection wiring for connecting the ground wiring to the ground pad. These connection wiring are dedicated wiring that are not connected to circuits other than the pads and the column amplifiers 106a, too.

A ratio in width between the connection wiring for the power wiring and the connection wiring for the ground wiring or a ratio in length between the connection wiring for the power wiring and the connection wiring for the ground wiring corresponds to the above wiring resistance ratio.

Though the wiring resistance ratio is determined by the wiring width in FIG. 18, the wiring resistance ratio may instead be determined by the wiring length, the wiring material, or the combination thereof.

Also, the power wiring and the ground wiring may be included in different wiring layers.

Fourth Embodiment

A fourth embodiment of the present invention relates to a solid-state imaging device that maximizes the efficient use of the dynamic range of the amplifier circuit.

Figure 19:
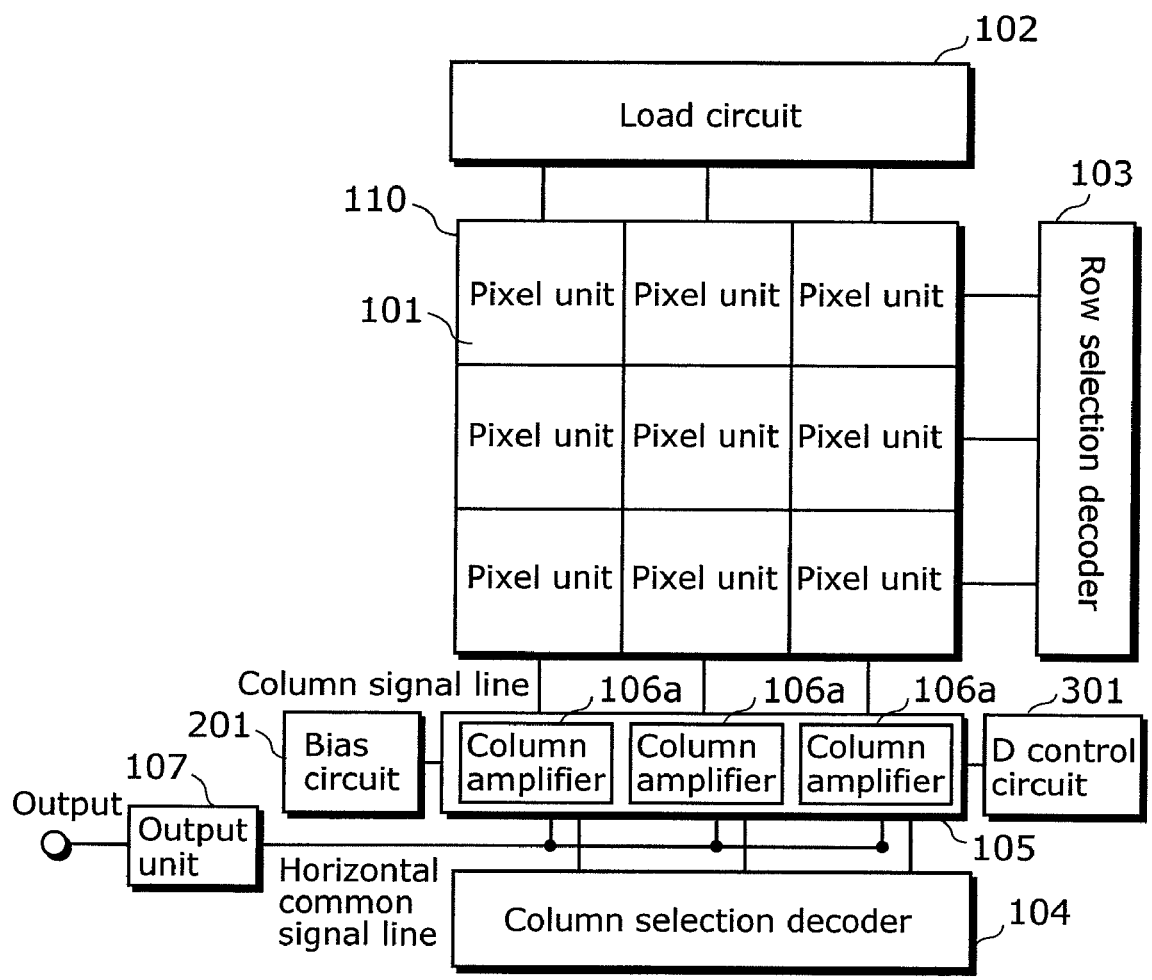
FIG. 19 is a block diagram showing a structure of a solid-state imaging device according to a fourth embodiment of the present invention.

FIG. 19 is a block diagram showing a structure of the solid-state imaging device according to this embodiment. FIG. 19 differs from FIG. 10 in that a D control circuit 301 is added. The following mainly describes this difference, while omitting an explanation of the same parts as FIG. 10.

The D control circuit 301 applies bias voltage NBias to the gate of the resistor transistor Tr3 in the resistor circuit 3, to maximize a dynamic range of the resistor circuit 3.

Figure 20:
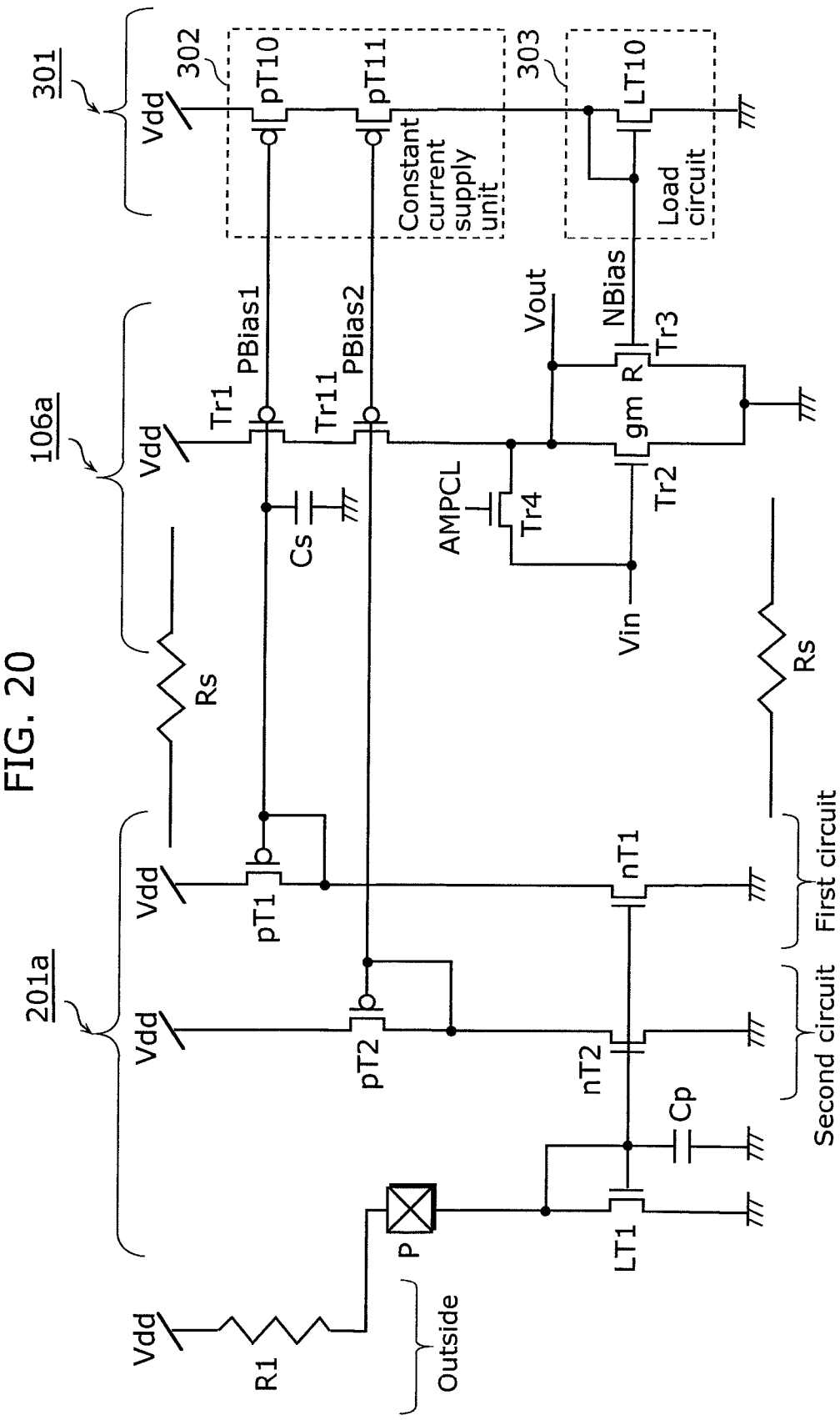
FIG. 20 shows a circuit example of a dynamic range control circuit shown in FIG. 19.

FIG. 20 shows a circuit example of the D control circuit 301. FIG. 20 also shows the bias circuit 201a and one column amplifier 106a. The D control circuit 301 includes a constant current supply unit 302 and a load circuit 303.

The constant current supply unit 302 includes two cascode-connected pMOS transistors pT10 and pT11 to which first and second bias voltages PBias1 and PBias2 are applied respectively from the first and second circuits. The constant current supply unit 302 supplies a constant current to the load circuit 303.

The load circuit 303 includes a load nMOS transistor LT10 having a drain connected to the constant current supply unit 302, a gate connected with the drain, and a source connected to the ground. The load circuit 303 supplies a gate potential of the load nMOS transistor LT10 to the gate of the resistor transistor Tr3 as bias voltage NBias.

Here, the load nMOS transistor LT10 is formed so that, on the semiconductor substrate on which the solid-state imaging device is formed, a length of a region of the load nMOS transistor LT10 is greater than a length of a region of the resistor transistor Tr3 by a predetermined value.

The constant current supply unit 302 has the same structure as the constant current circuit 1 in each column amplifier 106a. The voltage applied to the resistor circuit 3 is set to a value that is slightly smaller than an upper limit of a possible potential of the constant current circuit 1 and close to the upper limit. How much the voltage of the resistor circuit 3 is smaller than the upper limit is determined in accordance with the above predetermined value. Bias voltage NBias supplied to the gate of the resistor transistor Tr3 is set so that the voltage of the resistor transistor Tr3 is close to the upper limit.

In this way, a linear region of the resistor transistor Tr3 can be maximized. As a result, the output amplitude of the amplifier transistor Tr2 can be used as efficiently as possible.

Furthermore, even when characteristic variations exist between solid-state imaging devices, in each individual solid-state imaging device the correlation in characteristics between transistors is unaffected. Accordingly, the linear region of the resistor transistor Tr3 can be maximized without being affected by the characteristic variations.

The following describes a variation of the bias circuit for maximizing the output dynamic range of the amplifier transistor Tr2.

Figure 21:
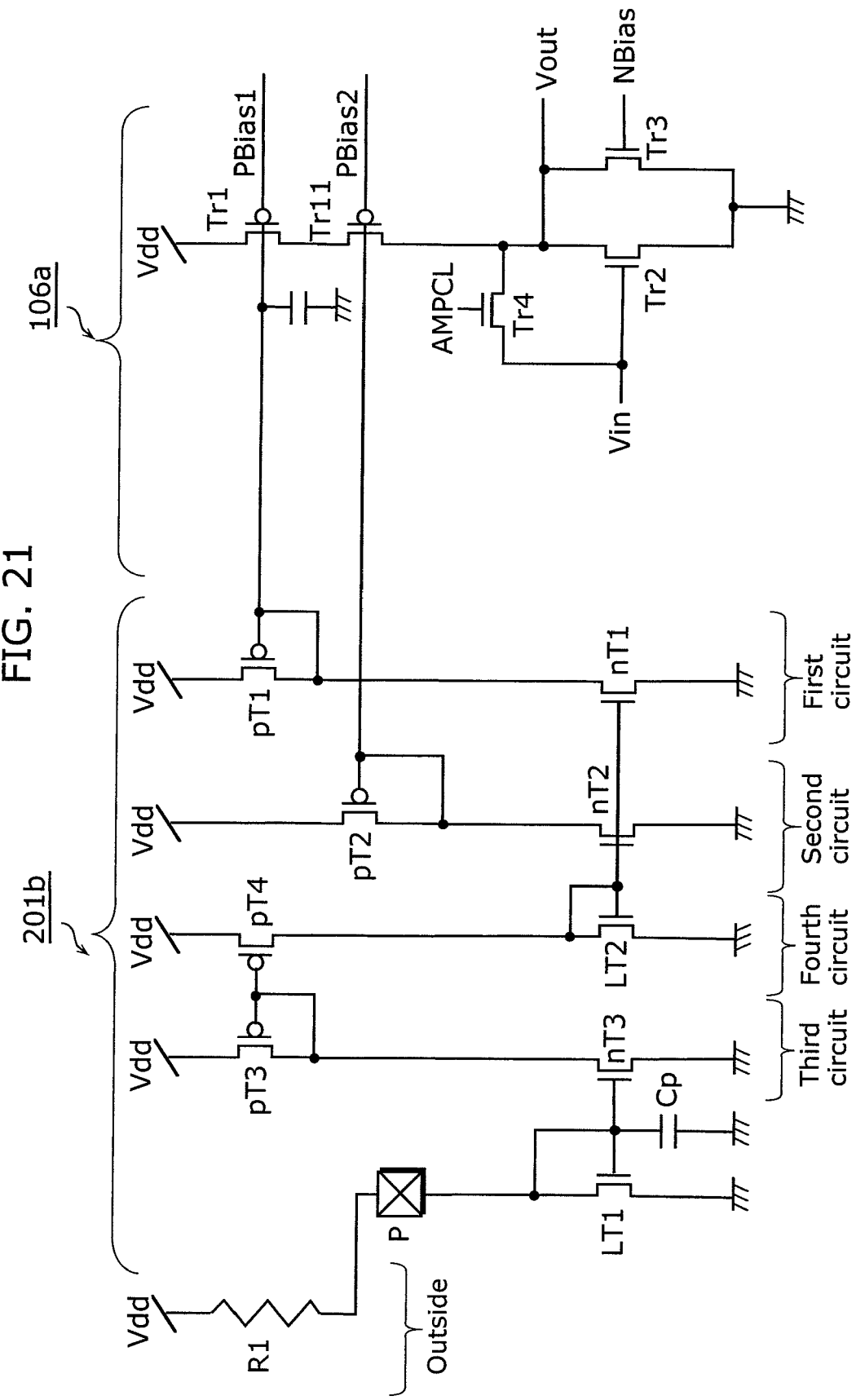
FIG. 21 shows a variation of the dynamic range control circuit.

FIG. 21 shows the variation of the bias circuit. A bias circuit 201b shown in FIG. 21 additionally includes a function for maximizing the output dynamic range of the amplifier transistor Tr2. FIG. 21 also shows one column amplifier 106a together with the bias circuit 201b.

The bias circuit 201b differs from the bias circuit 201a shown in FIG. 13, in that a third circuit and a fourth circuit are added. The following mainly describes this difference, while omitting an explanation of the same parts as FIG. 13.

The third circuit and the fourth circuit are inserted in wiring that connects the gate of the first load nMOS transistor LT1 and the gate of the second nMOS transistor nT2 in the second circuit (or the first nMOS transistor nT1 in the first circuit) in the bias circuit 201a shown in FIG. 13.

The third circuit includes a third pMOS transistor pT3 and a third nMOS transistor nT3, and forms a current mirror with the first load nMOS transistor LT1.

The third pMOS transistor pT3 has a source connected to the power wiring, and a gate and a drain connected with each other.

The third nMOS transistor nT3 has a drain connected to the drain of the third PMOS transistor pT3, a gate connected to the gate of the first load nMOS transistor LT1, and a source connected to the ground.

The fourth circuit includes a fourth PMOS transistor pT4 and a second load nMOS transistor LT2, and forms a current mirror with the first circuit and the second circuit.

The fourth PMOS transistor pT4 has a source connected to the power wiring, and a gate connected to the gate of the third PMOS transistor pT3.

The second load nMOS transistor LT2 has a drain connected to the drain of the fourth PMOS transistor pT4, a gate connected with the drain, and a source connected to the ground.

The gate of the first nMOS transistor nT1 in the first circuit is connected to the gate of the second load nMOS transistor LT2 in the fourth circuit. On the semiconductor substrate on which the solid-state imaging device is formed, a length of a region of the second load nMOS transistor LT2 is smaller than a length of a region of the first nMOS transistor nT1 by a predetermined value. Meanwhile, the first nMOS transistor nT1 and the second nMOS transistor nT2 have a same size as the resistor transistor Tr3.

The solid-state imaging device having such a structure can maximize the amount of constant current of the constant current circuit 1 (the constant current transistors Tr1 and Tr11). As a result, the output amplitude of the amplifier circuit 2 (the amplifier transistor Tr2) can be used as efficiently as possible. Also, even when characteristic variations exist between solid-state imaging devices, in each individual solid-state imaging device the correlation in characteristics between transistors is unaffected. Therefore, the output amplitude of the amplifier circuit 2 can be used as efficiently as possible, without being affected by the characteristic variations.

Figure 22:
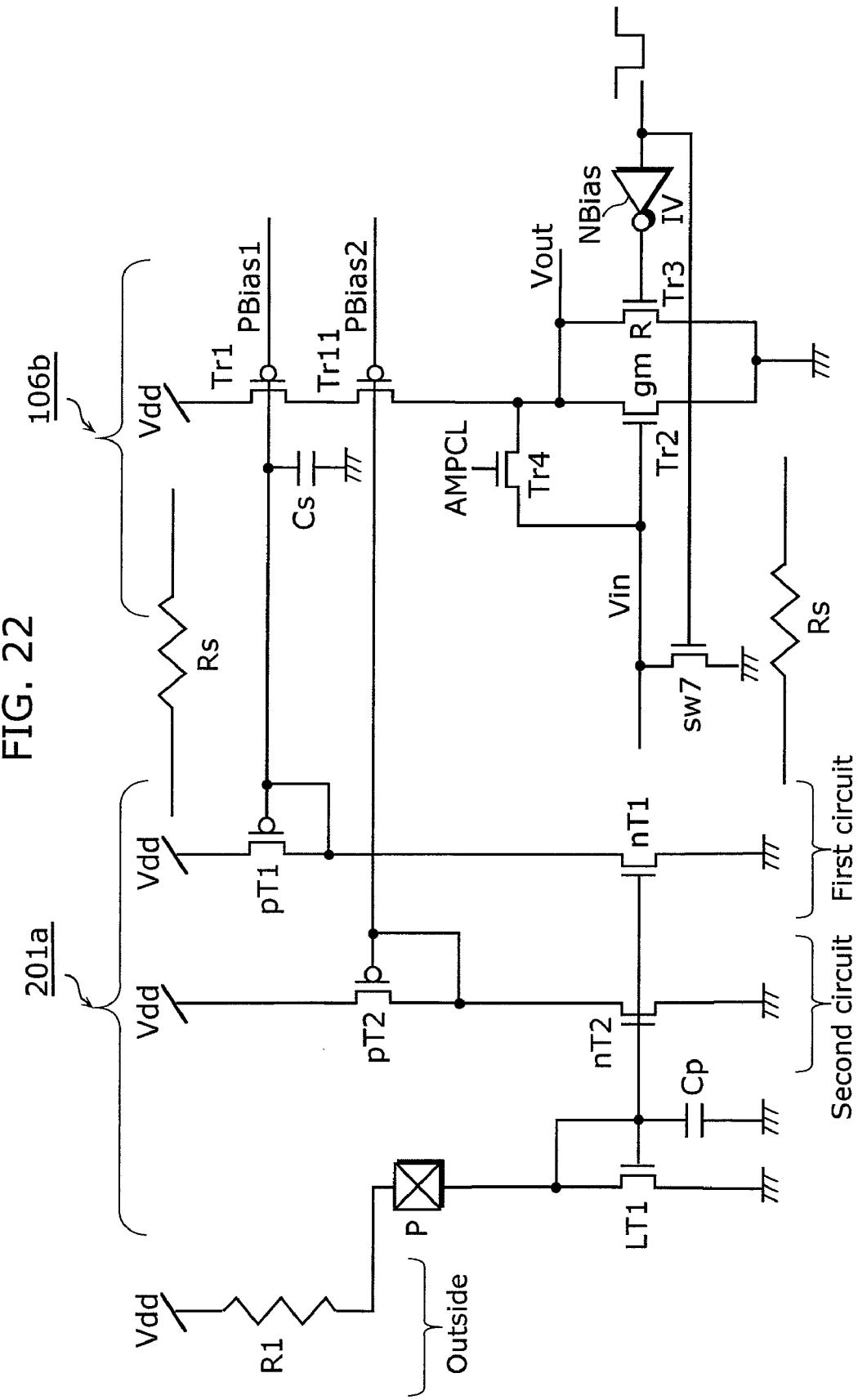
FIG. 22 shows another variation of the dynamic range control circuit.

FIG. 22 is a circuit diagram showing a variation of the column amplifier to which a power saving function is added. FIG. 22 differs from FIG. 13 in that an inverter circuit IV and a switch sw7 are added. The following mainly describes this difference, while omitting an explanation of the same parts as FIG. 13.

The inverter circuit IV receives an input of a low level and outputs bias voltage NBias in a normal operation mode, and receives an input of a high level and outputs a low level in a standby mode.

The switch sw7 is OFF in the normal operation mode, and ON in the standby mode.

In this circuit structure, input signal Vin of the amplifier transistor Tr2 is held at a low level and resistor transistor Tr3 is OFF, in the standby mode. As a result, current consumption of the amplifier transistor Tr2 and the resistor transistor Tr3 can be reduced in the standby mode.

Here, the input signal of the inverter circuit IV is preferably a signal showing a horizontal transfer period or a signal showing a horizontal blanking period. In this way, the circuitry can be stopped while not running, to reduce power consumption.

Fifth Embodiment

A fifth embodiment of the present invention relates to peripheral circuits of the column amplifier in the signal processing unit, such as a CDS (Correlated Double Sampling) circuit, a crushed black suppressor circuit, and an ADC (Analog to Digital Converter) circuit.

Figure 23A:
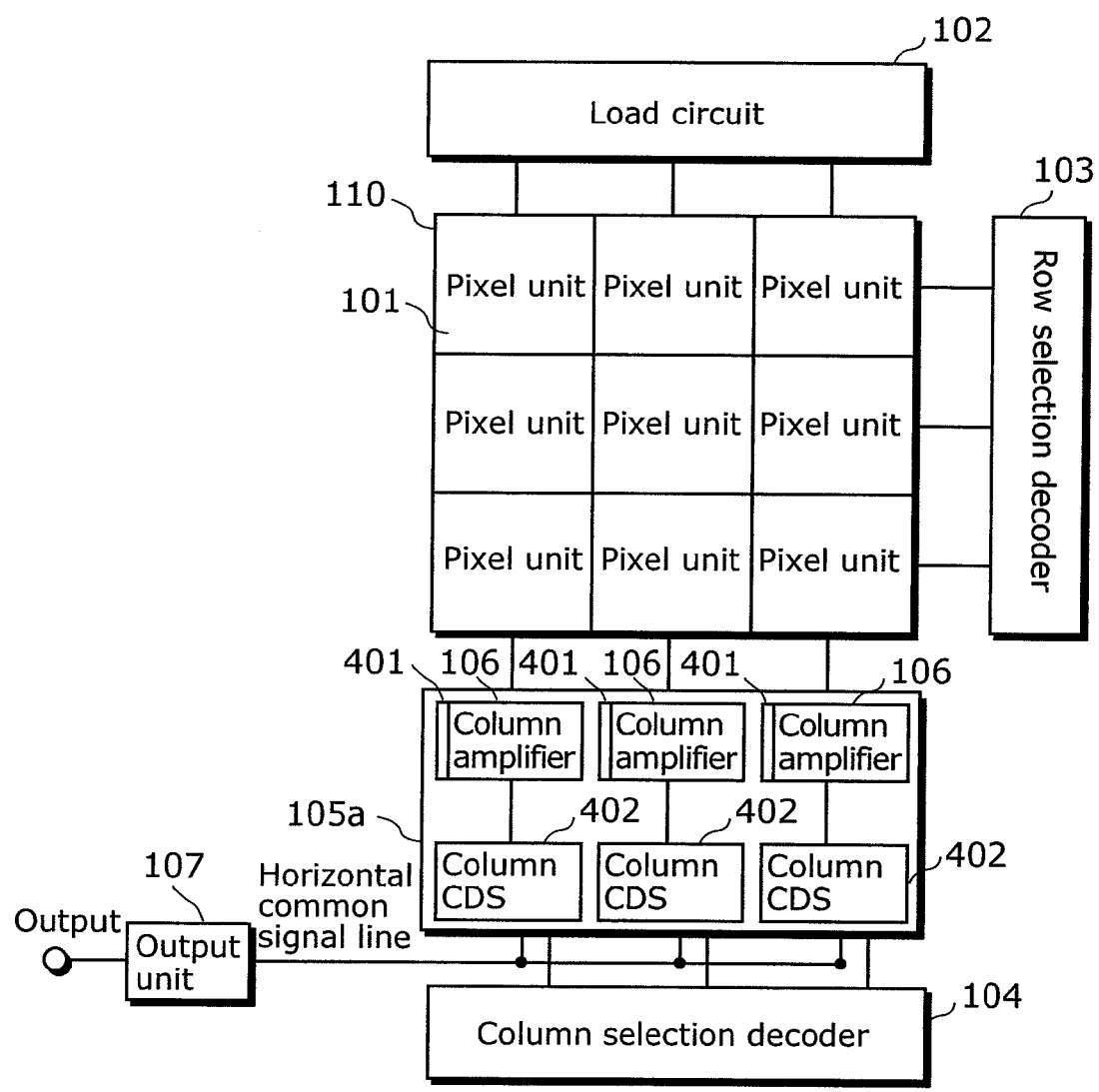
FIG. 23A is a block diagram showing a structure of a solid-state imaging device according to a fifth embodiment of the present invention.
Figure 23B:
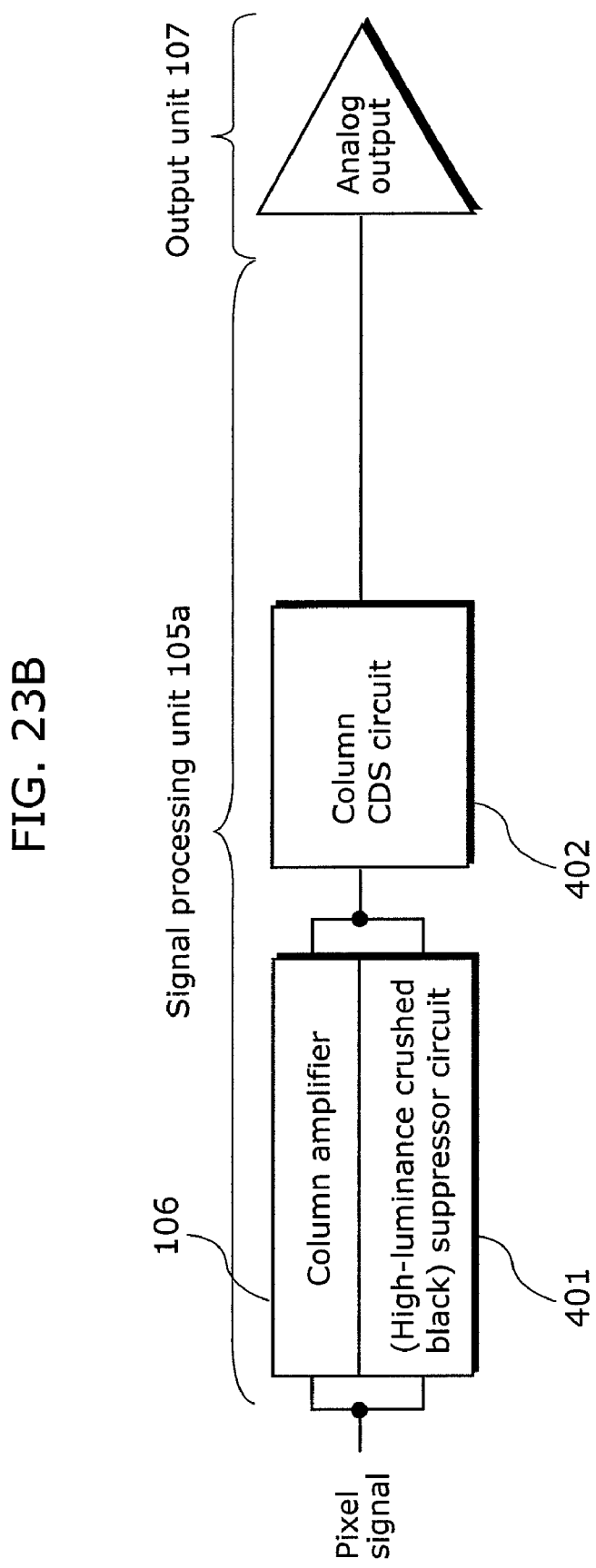
FIG. 23B shows a signal processing unit including a CDS circuit shown in FIG. 23A.

FIGS. 23A and 23B show a signal processing unit that includes a crushed black suppressor circuit and a CDS circuit according to this embodiment. FIG. 23B shows a circuit portion of a signal processing unit 105a corresponding to one column. The signal processing unit 105a includes a column amplifier 106, a high-luminance crushed black suppressor circuit 401, and a column CDS circuit 402, for each column.

The column amplifier 106 has already been described in the previous embodiments.

The high-luminance crushed black suppressor circuit 401 suppresses crushed blacks. Crushed blacks are caused by wrongly interpreting pixel signals which show strong luminances, as black. The high-luminance crushed black suppressor circuit 401 operates in parallel with the column amplifier 106.

The column CDS circuit 402 removes an offset component (reset noise) that varies between pixels.

According to this structure, offset noise included in the amplified signal from the column amplifier 106 is removed by the column CDS circuit 402. Since this is analog signal processing, a high S/N ratio without mixture of digital noise can be ensured.

Though the column amplifier 106 and the high-luminance crushed black suppressor circuit 401 are arranged in parallel in the above example, they may instead be arranged in serial. Also, the column amplifier 106 and the high-luminance crushed black suppressor circuit 401 may be realized by a single circuit.

Figure 24B:
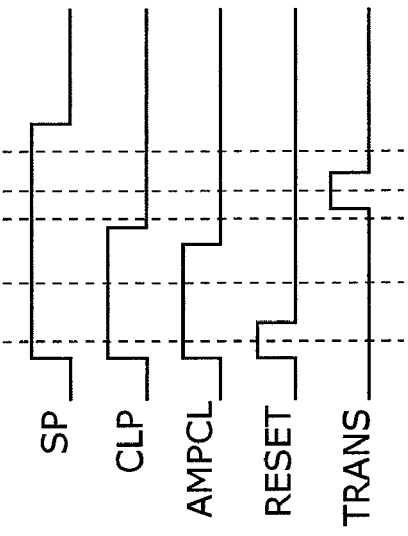
FIG. 24B shows a time chart of the CDS circuit shown in FIG. 24A.
Figure 24A:
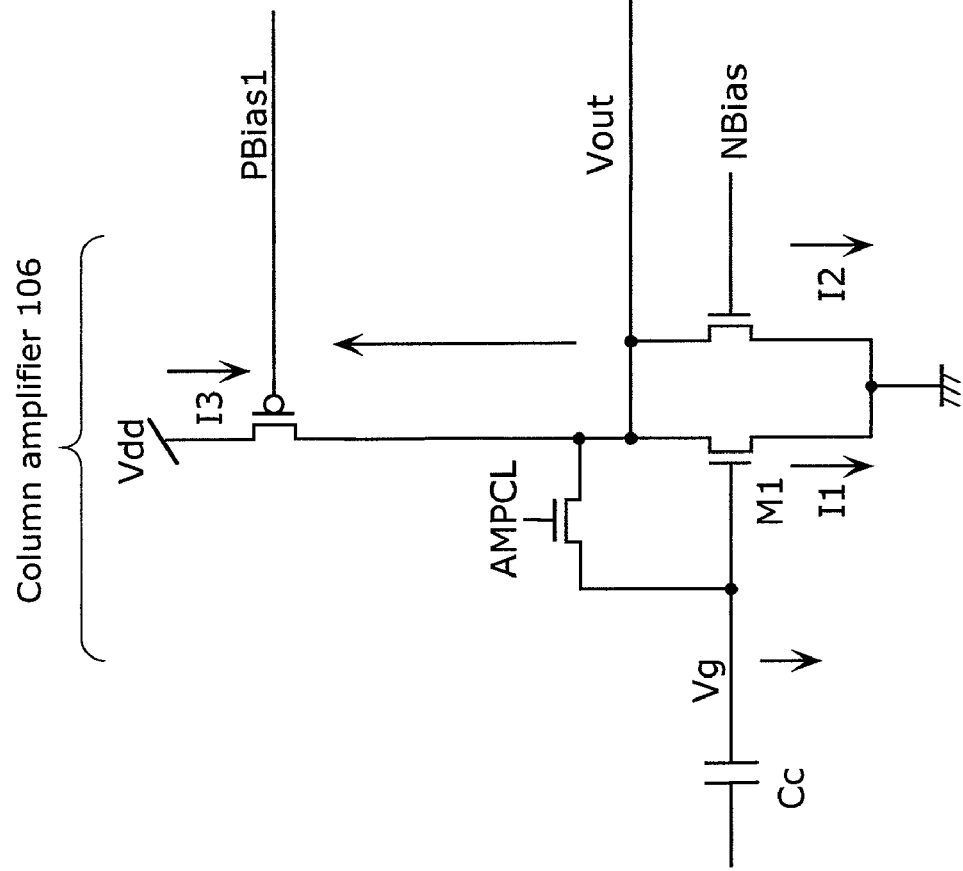
FIG. 24A shows a first circuit example of the CDS circuit.

FIG. 24A shows a first circuit example of the column CDS circuit 402. FIG. 24A also shows the column amplifier 106 for ease of explanation. The column CDS circuit 402 includes a clamp capacitor Cc, a clamp switch transistor TrCLP, a bias voltage source VBias, and a sample/hold capacitor Csh. The column CDS circuit 402 removes an offset component from a signal component, in accordance with a time chart shown in FIG. 24B.

Figures 25A, 25B:
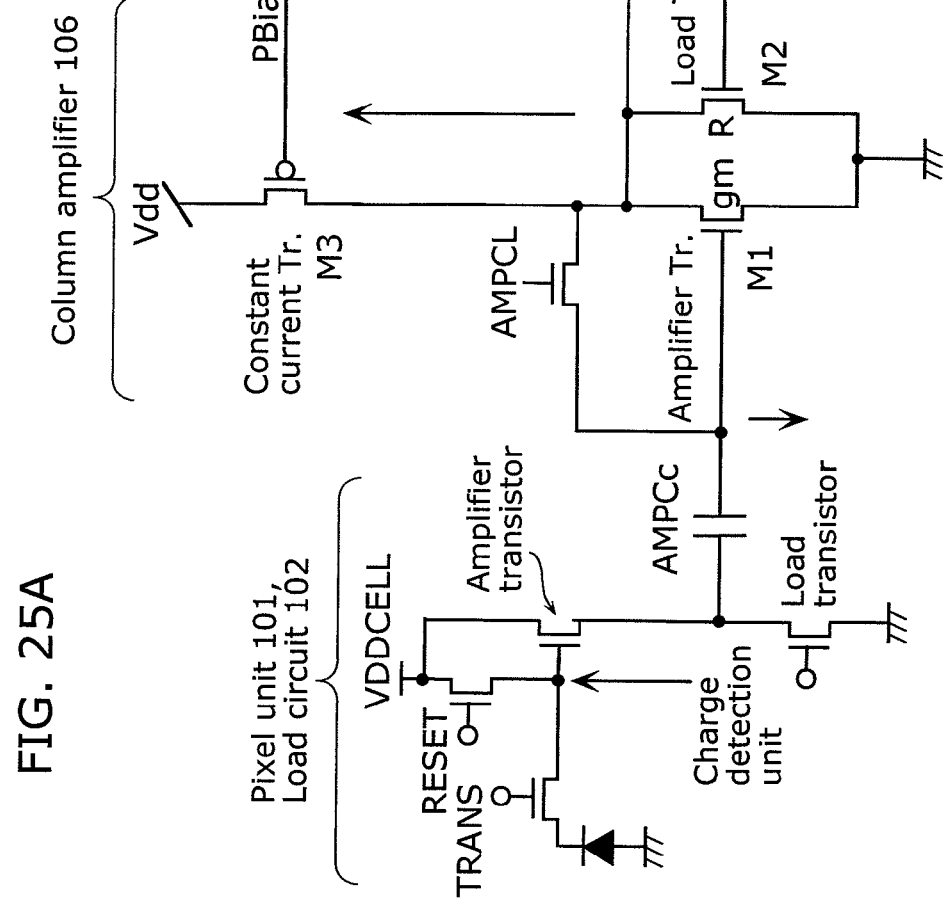
FIG. 25A shows a second circuit example of the CDS circuit.
FIG. 25B shows a time chart of the CDS circuit shown in FIG. 25A.

FIG. 25A shows a second circuit example of the column CDS circuit 402. FIG. 25A also shows the column amplifier 106, and the pixel unit 101 and the load circuit 102 that correspond to one column, for ease of explanation. A column CDS circuit 402a shown in FIG. 25A includes a clamp capacitor Cc, a sample/hold switch transistor TrSH, a bias voltage source VBias, a clamp switch transistor TrCLP, a sample/hold capacitor Csh, and an output switch transistor TrHSR. The column CDS circuit 402a removes an offset component from a signal component, in accordance with a time chart shown in FIG. 25B.

Figure 26A:
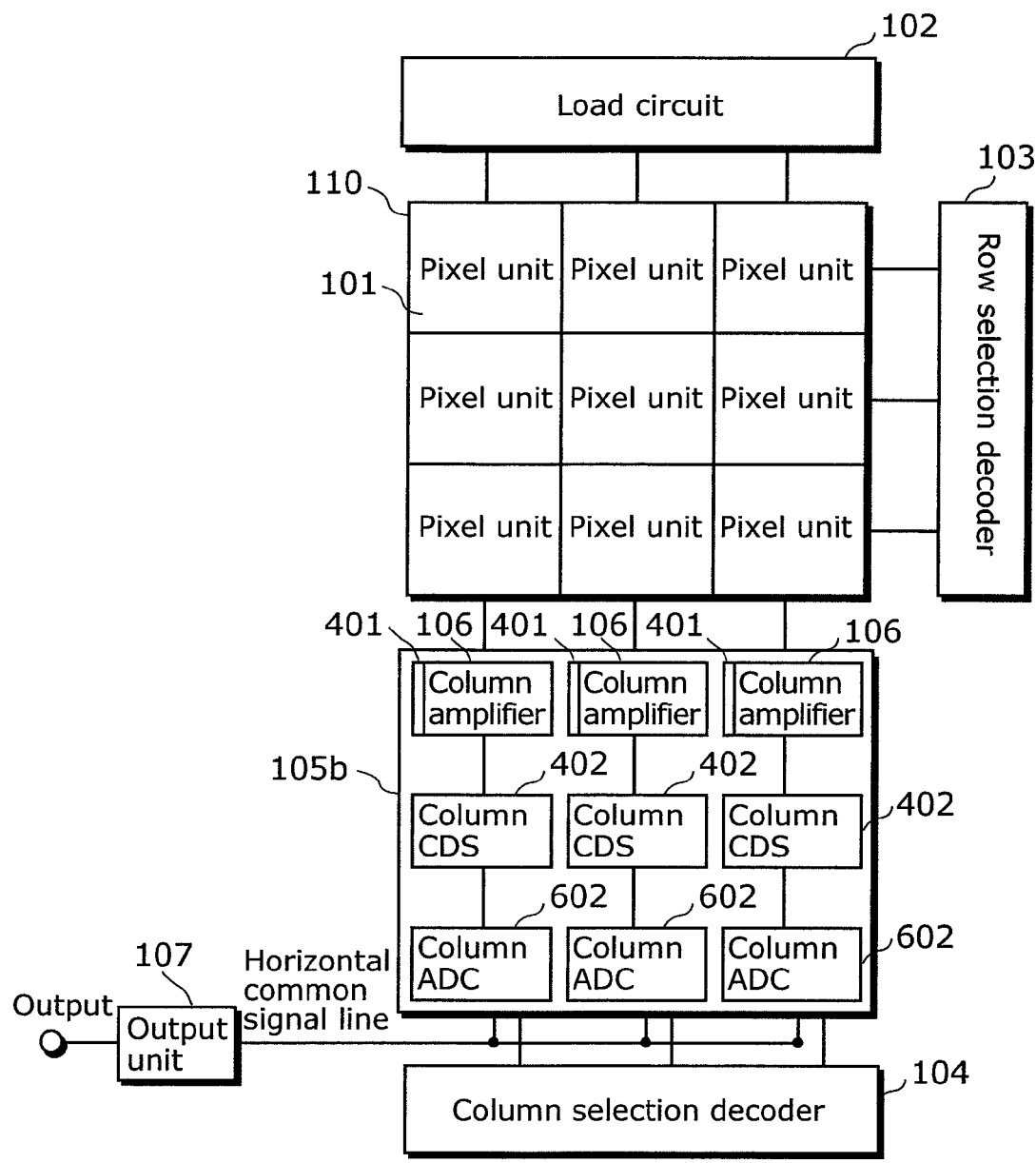
FIG. 26A is a block diagram showing a structure of a solid-state imaging device according to a variation of the fifth embodiment.
Figure 26B:
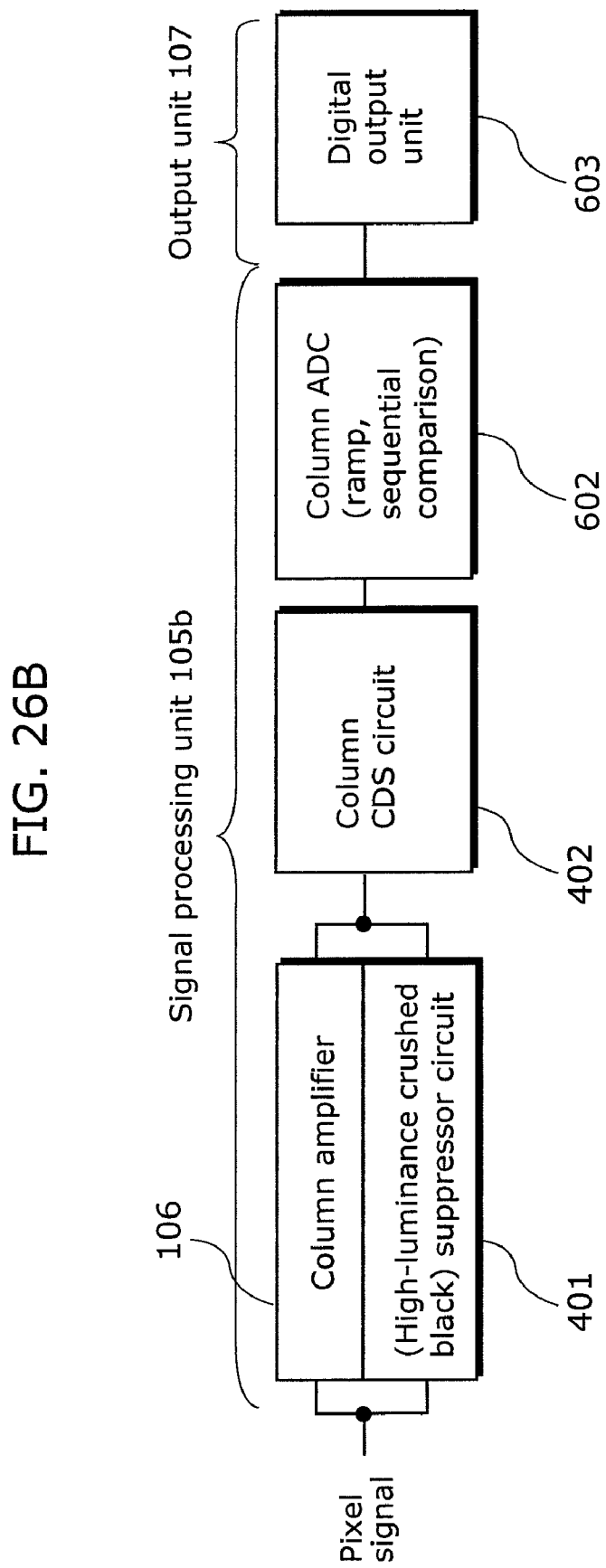
FIG. 26B shows a signal processing unit including a crushed black suppressor circuit, a CDS circuit, and a column ADC shown in FIG. 26A.

FIGS. 26A and 26B show a variation of the signal processing unit. A signal processing unit 105b shown in FIGS. 26A and 26B differs from the one shown in FIG. 23, in that a column ADC 602 is added. Also, the output unit 107 is a digital output unit 603. The following mainly describes this difference, while omitting an explanation of the same parts as FIG. 23.

The column ADC 602 can be realized by any type of column ADC. That is, any of an ADC with a digital double sampling function and an ADC without a digital double sampling function can be used as the column ADC 602.

One example of a column ADC without a digital double sampling function is a ramp ADC. An analog amplified signal from the column amplifier 106 is converted to a digital signal, which is then outputted from the digital output unit 603.

That is, by digitizing, in a high resolution, a plurality of pixel signals in a horizontal period using a plurality of column ADCs, high-speed data output can be achieved with a high band.

Furthermore, the use of a column ADC without a digital double sampling function has other advantages such as a simple circuit structure (a circuit area of the signal processing unit 105b can be reduced) and faster data processing than a column ADC with a digital double sampling function.

On the other hand, the use of a column ADC with a digital double sampling function has an advantage of accurate noise removal (removal of an offset component) because the column CDS circuit 402 and the column ADC 602 perform noise removal.

Note here that the column amplifier 106 and the high-luminance crushed black suppressor circuit 401 may be arranged in series, or may be realized by a single structure.

Figure 27A:
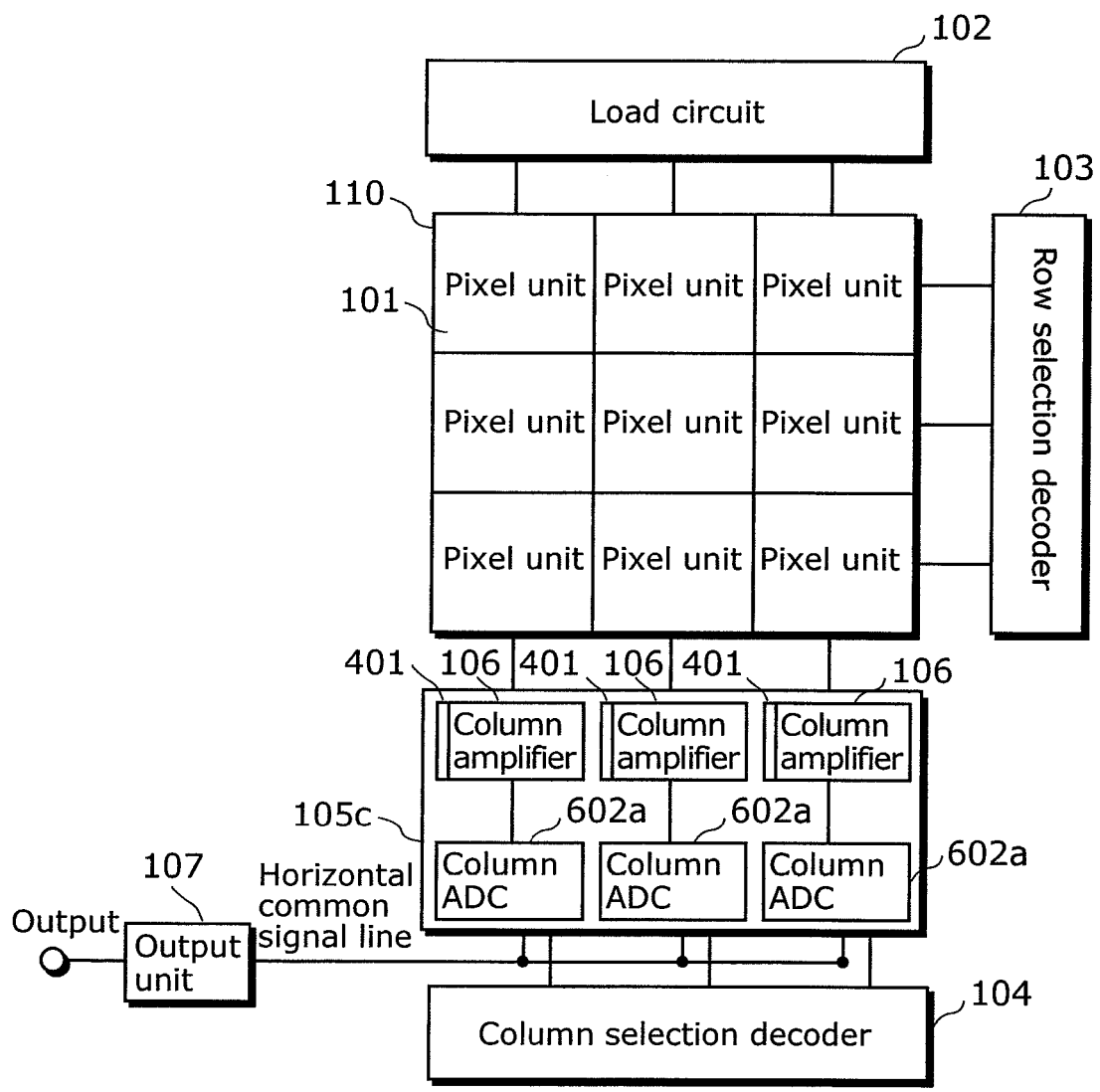
FIG. 27A is a block diagram showing a structure of a solid-state imaging device according to another variation of the fifth embodiment.
Figure 27B:
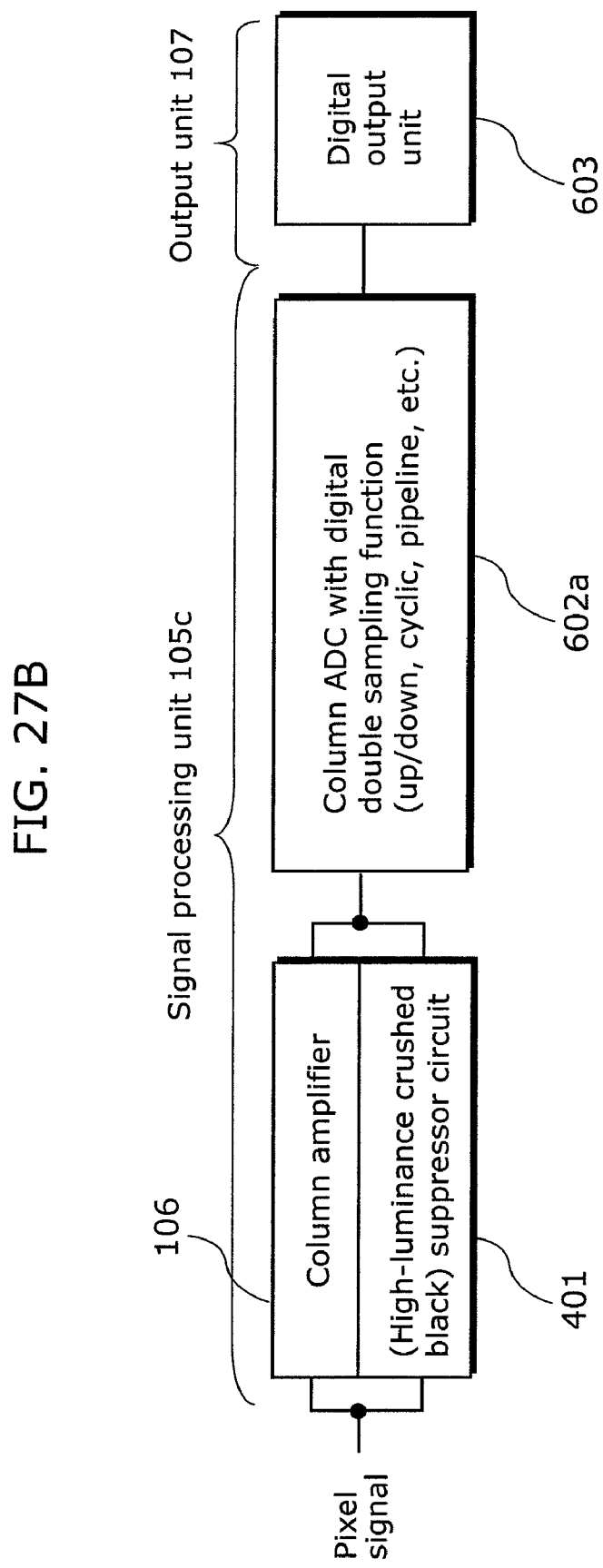
FIG. 27B shows a signal processing unit shown in FIG. 27A.

FIGS. 27A and 27B show another variation of the signal processing unit. A signal processing unit 105c shown in FIGS. 27A and 27B differs from the one shown in FIG. 26, in that the column CDS circuit 402 is omitted and the column ADC 602 is replaced by a column ADC 602a. The following mainly describes this difference, while omitting an explanation of the same parts as FIG. 26.

The column ADC 602a is an ADC with a digital double sampling function. In detail, the column ADC 602a is an up/down ADC (a ramp ADC with a digital double sampling function), a pipeline ADC, a cyclic ADC, a sequential comparison ADC, or the like. In this case, the column ADC 602a also performs removal of an offset component from the signal received from the column amplifier 106 or the high-luminance crushed black suppressor circuit 401. That is, the column ADC 602a removes an output offset component from the signal of the column amplifier 106 in a horizontal period. Since the column ADC 602a outputs a digital signal, high-speed data output can be achieved with a high band. Also, the omission of the column CDS circuit enables the solid-state imaging device to be reduced in size.

Note here that the column amplifier 106 and the high-luminance crushed black suppressor circuit 401 may have any of a parallel structure, a serial structure, and a single structure.

The above embodiments and variations may be freely combined unless they are mutually exclusive.

The present invention is suitable for use in an amplifier-type solid-state imaging device having a plurality of photodiodes formed on a semiconductor substrate, and a camera including such a solid-state imaging device. In more detail, the present invention is suitable for use in a MOS image sensor, a digital still camera, a camera mobile phone, a surveillance camera, a built-in camera of a notebook computer, a camera unit connected to an information processing device, and the like.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:
1. A solid-state imaging device comprising:
a plurality of pixel units that are arranged in a matrix;
column signal lines that are each provided for a different one of columns of the matrix to carry a pixel signal from a pixel unit which belongs to a corresponding column; and column amplifier units that are each provided for a different one of said column signal lines,
wherein each of said column amplifier units includes:
a constant current circuit that supplies a constant current;
an amplifier circuit that is connected in series with said constant current circuit, and amplifies a pixel signal from a corresponding column signal line and outputs the amplified signal from a point of connection with said constant current circuit; and
a resistor circuit that is connected in parallel with said amplifier circuit and has a constant resistance,
wherein said constant current circuit includes at least one transistor as a constant current supply,
wherein said amplifier circuit includes an amplifier transistor having a gate to which the pixel signal is input, and a source and a drain from one of which the amplified signal is output, and
wherein said resistor circuit includes a resistor transistor having a gate to which a bias voltage corresponding to a linear region is applied,
wherein said at least one transistor in said constant current circuit comprises two cascode-connected pMOS transistors,
wherein the solid-state imaging device further comprises a bias circuit that controls an amount of constant current flowing in each of said column amplifier units,
wherein said bias circuit includes:
a first load nMOS transistor having a drain connected to a constant current source, a gate short-circuited with the drain, and a source connected to a ground;
a first circuit that forms a current mirror with said first load nMOS transistor; and
a second circuit that forms a current mirror with said first load nMOS transistor,
said first circuit supplies a first bias voltage to a gate of one of said two cascode-connected pMOS transistors,
said second circuit supplies a second bias voltage to a gate of an other one of said two cascode-connected pMOS transistors, and
a ratio between a length and a width of a region of said amplifier transistor, which is a MOS transistor, is equal to a ratio between a length and a width of a region of said first load nMOS transistor, on a semiconductor substrate on which said solid-state imaging device is provided.

2. The solid-state imaging device according to claim 1, further comprising:
correlated double sampling circuits that each receive an amplified signal from a different one of said column amplifier units; and
an outputter that receives a signal from any of said correlated double sampling circuits and outputs an analog signal.

3. The solid-state imaging device according to claim 1, further comprising:
correlated double sampling circuits that each receive an amplified signal from a different one of said column amplifier units; and
AD converters that each receive a signal from a different one of said correlated double sampling circuits, and convert the received signal from analog to digital.

4. The solid-state imaging device according to claim 3, wherein said AD converters are ramp AD converters.

5. The solid-state imaging device according to claim 1, further comprising
AD converters that each have a digital double sampling function, and receive an amplified signal from a different one of said column amplifier units and convert the received signal from analog to digital.

6. The solid-state imaging device according to claim 5, wherein said AD converters are up/down AD converters.

7. The solid-state imaging device according to claim 1, further comprising:
power wiring that is connected to said constant current circuits in said column amplifier units; and
ground wiring that is connected to said amplifier circuits and said resistor circuits in said column amplifier units,
wherein a metal wiring layer including said power wiring and said ground wiring is located above a wiring layer including wiring that connects said amplifier circuit with said resistor circuit in each of said column amplifier units.

8. The solid-state imaging device according to claim 1,
wherein said first circuit includes:
a first pMOS transistor having a gate short-circuited with a drain, a source connected to power wiring, and the drain connected to the gate of said one of said two cascode-connected pMOS transistors; and
a first nMOS transistor having a drain connected to the drain of said first pMOS transistor, a gate connected to the gate of said first load nMOS transistor, and a source connected to the ground,
said second circuit includes:
a second pMOS transistor having a gate short-circuited with a drain, a source connected to the power wiring, and the drain connected to the gate of said other one of said two cascode-connected pMOS transistors; and
a second nMOS transistor having a drain connected to the drain of said second pMOS transistor, a gate connected to the gate of said first load nMOS transistor, and a source connected to the ground, and
the ratio between the length and the width of the region of said amplifier transistor is equal to a ratio between a length and a width of each of a region of said first nMOS transistor and a region of said second nMOS transistor, on said semiconductor substrate.

9. The solid-state imaging device according to claim 8,
wherein said bias circuit further includes
a third circuit and a fourth circuit that are inserted in wiring for connecting the gate of said first load nMOS transistor and said first circuit,
said third circuit includes:
a third pMOS transistor having a source connected to said power wiring, and a gate and a drain connected to each other; and
a third nMOS transistor having a drain connected to the drain of said third pMOS transistor, a gate connected to the gate of said first load nMOS transistor, and a source connected to the ground,
said fourth circuit includes:
a fourth pMOS transistor having a source connected to said power wiring, and a gate connected to the gate of said third pMOS transistor; and
a second load nMOS transistor having a drain connected to the drain of said fourth pMOS transistor, a gate connected with the drain, and a source connected to the ground,
the gate of said first nMOS transistor in said first circuit is connected to the gate of said second load nMOS transistor, and
a length of a region of said second load nMOS transistor is smaller than a length of the region of said first nMOS transistor by a predetermined value, on said semiconductor substrate.

10. The solid-state imaging device according to claim 1,
wherein the drain of said first load nMOS transistor is connected to the constant current source via a pad that is provided on said semiconductor substrate.

11. The solid-state imaging device according to claim 10,
wherein an amount of constant current of the constant current source is adjustable, and
said solid-state imaging device further comprises
a variable voltage generation unit that applies a variable bias voltage to the gate of said resistor transistor which is a MOS transistor.

12. The solid-state imaging device according to claim 1,
wherein the drain of said first load nMOS transistor is connected to said constant current source that is included in said solid-state imaging device.

13. The solid-state imaging device according to claim 1, further comprising
a control circuit that controls a dynamic range of said resistor circuit, by applying the bias voltage to the gate of said resistor transistor in said resistor circuit,
wherein said control circuit includes:
a constant current supplier that includes two cascode-connected pMOS transistors to which the first bias voltage and the second bias voltage are applied from said first circuit and said second circuit, respectively; and
a load circuit that includes an nMOS transistor having a drain connected to said constant current supplier, a gate connected with the drain, and a source connected to the ground, and supplies a gate potential of said nMOS transistor to said resistor circuit as the bias voltate, and
a length of a region of said nMOS transistor in said load circuit is greater, by a predetermined value, than a length of a region of said resistor transistor, which is a MOS transistor, on said semiconductor substrate.

14. A camera comprising the solid-state imaging device according to claim 1.

15. A solid-state imaging device comprising:
a plurality of pixel units that are arranged in a matrix;
column signal lines that are each provided for a different one of columns of the matrix to carry a pixel signal from a pixel unit which belongs to a corresponding column; and
column amplifier units that are each provided for a different one of said column signal lines,
wherein each of said column amplifier units includes:
a constant current circuit that supplies a constant current;
an amplifier circuit that is connected in series with said constant current circuit, and amplifies a pixel signal from a corresponding column signal line and outputs the amplified signal from a point of connection with said constant current circuit; and
a resistor circuit that is connected in parallel with said amplifier circuit and has a constant resistance,
wherein said constant current circuit includes two cascode-connected pMOS transistors as a constant current supply,
said amplifier circuit includes:
a first switch;
a first amplifier transistor having a drain connected to said constant current circuit via said first switch, a gate to which the pixel signal is input, and a source connected to a ground, and outputting the amplified signal from the drain;
a second switch; and
a second amplifier transistor having a drain connected to said constant current circuit via said second switch, a gate to which the pixel signal is input, and a source connected to the ground, and outputting the amplified signal from the drain,
said resistor circuit includes:
a third switch;
a first resistor transistor having a drain connected to said constant current circuit via said third switch, and a gate to which a bias voltage corresponding to a linear region is applied;
a fourth switch; and
a second resistor transistor having a drain connected to said constant current circuit via said fourth switch, and a gate to which a bias voltage corresponding to a linear region is applied,
said first switch and said third switch turn ON or OFF in conjunction with each other, and
said second switch and said fourth switch turn ON or OFF in conjunction with each other.

16. The solid-state imaging device according to claim 15, further comprising
a bias circuit that controls an amount of constant current flowing in each of said column amplifier units,
wherein said bias circuit includes:
a fifth switch;
a first load nMOS transistor having a drain connected to a constant current source via said fifth switch, a gate connected with the drain, and a source connected to the ground;
a sixth switch;
a second load nMOS transistor having a drain connected to the constant current source via said sixth switch, a gate connected with the drain, and a source connected to the ground;
a first circuit that forms a current mirror with said first load nMOS transistor or said second load nMOS transistor; and
a second circuit that forms a current mirror with said first load nMOS transistor or said second load nMOS transistor,
said first circuit supplies a first bias voltage to a gate of one of said two cascode-connected pMOS transistors,
said second circuit supplies a second bias voltage to a gate of an other one of said two cascode-connected pMOS transistors,
said fifth switch turns ON or OFF in conjunction with said first switch and said third switch, and
said sixth switch turns ON or OFF in conjunction with said second switch and said fourth switch.

17. The solid-state imaging device according to claim 16,
wherein the drain and the gate of said first load nMOS transistor are connected to each other via said fifth switch, and
the drain and the gate of said second load nMOS transistor are connected to each other via said sixth switch.

18. A solid-state imaging device comprising:
a plurality of pixel units that are arranged in a matrix;
column signal lines that are each provided for a different one of columns of the matrix to carry a pixel signal from a pixel unit which belongs to a corresponding column; and
column amplifier units that are each provided for a different one of said column signal lines,
wherein each of said column amplifier units includes:
a constant current circuit that supplies a constant current;
an amplifier circuit that is connected in series with said constant current circuit, and amplifies a pixel signal from a corresponding column signal line and outputs the amplified signal from a point of connection with said constant current circuit; and a resistor circuit that is connected in parallel with said amplifier circuit and has a constant resistance, power wiring that is connected to said constant current circuits in said column amplifier units; and ground wiring that is connected to said amplifier circuits and said resistor circuits in said column amplifier units, wherein said power wiring and said ground wiring are exclusively used for said column amplifier units, wherein a ratio between a wiring resistance of said power wiring and a wiring resistance of said ground wiring is equal to a ratio between a conductance of said constant current circuit and a conductance of said amplifier circuit and said resistor circuit in each of said column amplifier units.

19. The solid-state imaging device according to claim 18, wherein said power wiring and said ground wiring have different widths to satisfy the wiring resistance ratio.

20. The solid-state imaging device according to claim 18, wherein said power wiring and said ground wiring have different lengths to satisfy the wiring resistance ratio.

21. The solid-state imaging device according to claim 18, wherein a semiconductor substrate on which said solid-state imaging device is provided includes a power pad and a ground pad, said solid-state imaging device further comprises:

first connection wiring that connects said power wiring to said power pad; and second connection wiring that connects said ground wiring to said ground pad, and a ratio between a width of said first connection wiring and a width of said second connection wiring or a ratio between a length of said first connection wiring and a length of said second connection wiring corresponds to the wiring resistance ratio.

22. The solid-state imaging device according to claim 18, wherein said power wiring is metal wiring that is provided to shield said constant current circuits from light, and said ground wiring is metal wiring that is provided to shield said amplifier circuits and said resistor circuits from light.

23. A solid-state imaging device comprising:

a plurality of pixel units that are arranged in a matrix;

column signal lines that are each provided for a different one of columns of the matrix to carry a pixel signal from a pixel unit which belongs to a corresponding column;

column amplifier units that are each provided for a different one of said column signal lines;

power wiring that is connected to said column amplifier units; and ground wiring that is connected to said column amplifier units, wherein said power wiring and said ground wiring are exclusively used for said column amplifier units, and a ratio between a wiring resistance of said power wiring and a wiring resistance of said ground wiring is equal to a ratio between a conductance when said power wiring is seen from an output signal of each of said column amplifier units and a conductance when said ground wiring is seen from the output signal of each of said column amplifier units.

24. The solid-state imaging device according to claim 23, wherein said power wiring and said ground wiring have different widths that satisfy the wiring resistance ratio.

* * * * *